US008531795B2

(12) United States Patent
Mukoh et al.

(10) Patent No.: US 8,531,795 B2
(45) Date of Patent: Sep. 10, 2013

(54) APPARATUS AND METHOD FOR INSPECTING THERMALLY ASSISTED MAGNETIC HEAD

(71) Applicant: Hitachi, Ltd., Tokyo (JP)

(72) Inventors: Masaki Mukoh, Fuchu (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/658,847

(22) Filed: Oct. 24, 2012

(65) Prior Publication Data

US 2013/0107678 A1    May 2, 2013

(30) Foreign Application Priority Data

Oct. 27, 2011    (JP) .................................. 2011-236408

(51) Int. Cl.
*G11B 5/455*    (2006.01)

(52) U.S. Cl.
USPC .................. 360/59; 369/13.26; 369/53.26

(58) Field of Classification Search
None
See application file for complete search history.

(56) References Cited

U.S. PATENT DOCUMENTS

| 5,475,666 A * | 12/1995 | Ito et al. ............. 369/13.27 |
| 2006/0187564 A1 | 8/2006 | Sato et al. |
| 2009/0040645 A1 | 2/2009 | Shimazawa et al. |

FOREIGN PATENT DOCUMENTS

| JP | 2006-185548 | 7/2006 |
| JP | 2009-43377 | 2/2009 |

OTHER PUBLICATIONS

Hideki Saga et al., New Recording Method Combining Thermo-Magnetic Writing and Flux Detection, Japanese Journal of Applied Physics, Mar. 1999, pp. 1839-1840, vol. 38, Part 1, No. 3B.
Takuya Matsumoto et al., An Efficient Probe with a Planar Metallic Pattern for High-Density Near-Filed Optical Memory, Technical Digest of 6$^{th}$ international conference on near filed optics and related techniques, Netherlands, p. 55, 2000.

* cited by examiner

*Primary Examiner* — Wayne Young
*Assistant Examiner* — Brian Butcher
(74) *Attorney, Agent, or Firm* — Antonelli, Terry, Stout & Kraus, LLP.

(57) ABSTRACT

The wavelength is monitored using a spectrum analyzer in a state where a semiconductor laser is being driven while changing the light-emitting time of the semiconductor laser. When the internal temperature of the semiconductor laser estimated from a measured wavelength falls out of a preset temperature range, a gimbal assembly is identified as a defective product.

8 Claims, 19 Drawing Sheets

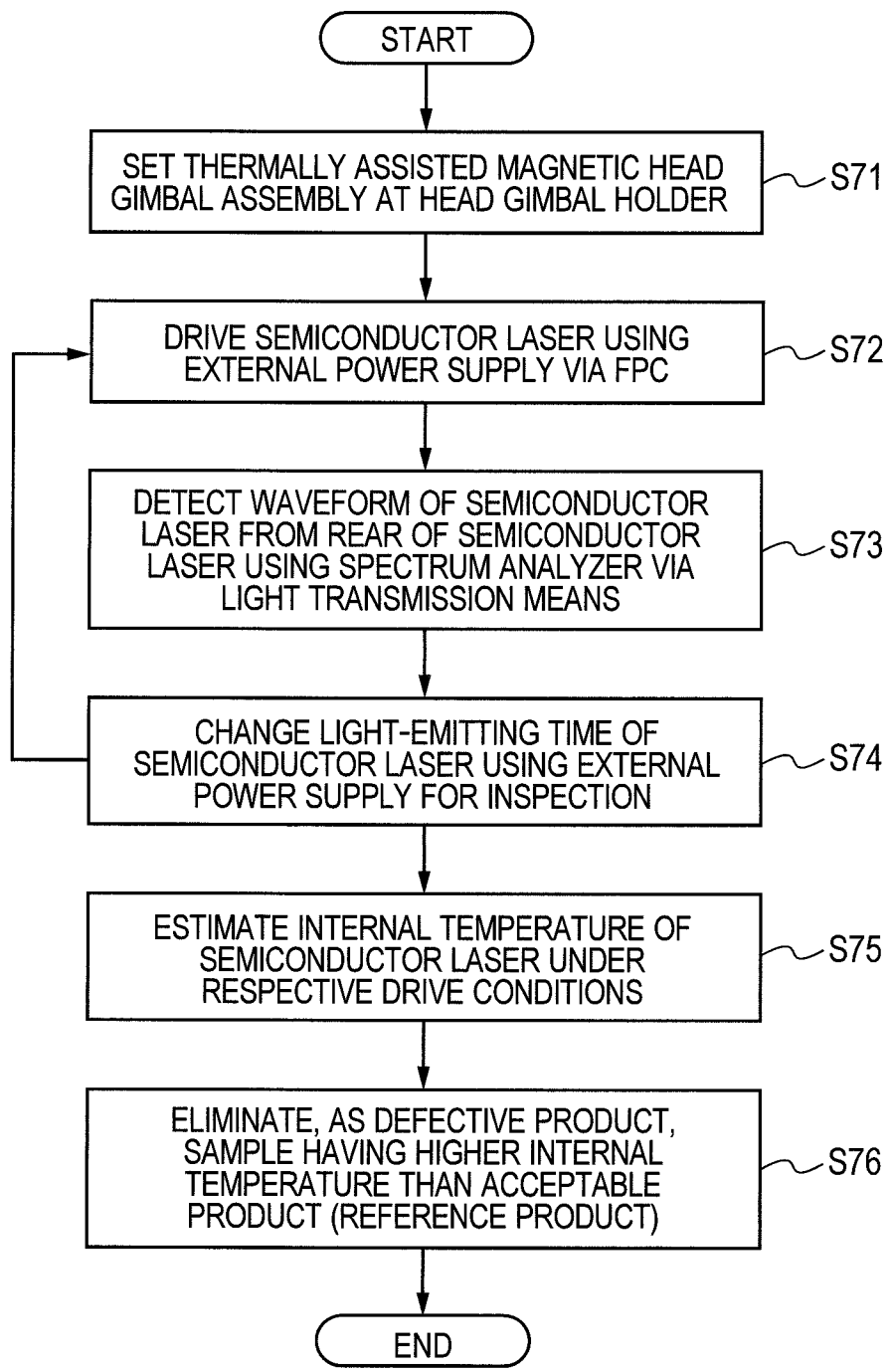

APPARATUS AND METHOD FOR INSPECTING THERMALLY ASSISTED MAGNETIC HEAD

CLAIM OF PRIORITY

The present application claims priority from Japanese patent application JP 2011-236408 filed on Oct. 27, 2011, the content of which is hereby incorporated by reference into this application.

FIELD OF THE INVENTION

The present invention relates to an apparatus and method for inspecting a thermally assisted magnetic head mounted on a magnetic recording apparatus.

BACKGROUND OF THE INVENTION

Thermally assisted magnetic recording is proposed as a recording method for achieving a recording density of 1 Tb/in$^2$ or more (Jpn. J. Appl. Phys. 38, Part 1, p. 1839 (1999)). Traditional magnetic recording causes thermal fluctuation when the recording density becomes 1 Tb/in$^2$ or more, losing recorded information. Preventing this problem requires increasing the coercivity of the magnetic recording medium. However, there is a limit to the size of a magnetic field that can be generated by the recording head. Excessively increasing the coercivity makes it impossible to form recording bits on the medium. To solve this problem, thermally assisted magnetic recording heats the magnetic recording medium using light at the moment of recording to reduce the coercivity. This makes it possible to record information onto a coercive medium and achieve a recording density of 1 Tb/in$^2$ or more.

In thermally assisted magnetic recording, the spot diameter of applied light must be a size similar to that of a recording bit (several tens of nm). This is because light having a larger spot diameter than a recording bit would erase information in adjacent tracks. For this reason, near-field light is used to heat such a minute region. Near-field light is a local electromagnetic field that is present near a minute object having a length shorter than the optical wavelength (light whose wave number has imaginary components). It is generated using a minute aperture or metallic scatterer having a diameter smaller than the optical wavelength. For example, use of a triangular metallic scatterer as an efficient near-field light generator is proposed (Technical Digest of 6th international conference on near field optics and related techniques, Netherlands, Aug. 27-31, 2000, p. 55). Entry of light into the metallic scatterer excites plasmon resonance in the metallic scatterer, generating intense near-field light at the top of the triangle. Use of this near-field light generator allows light to be efficiently focused on a region having a size of several tens of nm or less.

Japanese Unexamined Patent Publication No. 2006-185548 discloses a thermally assisted magnetic head including a slider and a light source unit. The slider includes a magnetic head portion having an optical waveguide disposed adjacent to an electromagnetic coil element in the layering direction of the magnetic head. The light source unit includes a light source disposed on a light source support substrate which is different from the slider In this configuration, light emitted from the light source is introduced into the optical waveguide and emitted from the light-emitting surface of the optical waveguide in the medium-opposed surface. As a result, the magnetic recording medium can be heated locally.

Japanese Unexamined Patent Publication No. 2009-43377 discloses a thermally assisted magnetic head including a temperature sensor. This thermally assisted magnetic head achieves stable recording by inspecting the temperature of the head before recording.

SUMMARY OF THE INVENTION

Achieving stable recording using a thermally assisted magnetic head requires keeping the intensity of near-field light on the medium constant. However, in the thermally assisted magnetic head, power entering the near-field light element may change due to a change in optical properties caused by a change in an external environment such as the temperature of the light source. Power emitted by a semiconductor laser (LD), which is a typical light source, is sensitive to the temperature. Since the guaranteed operating temperature of a general semiconductor laser is about 90° C., many laser diode drivers (LDDs) are provided with a temperature control system for a semiconductor laser. For a thermally assisted magnetic head, on the other hand, the drive operating temperature acting as a surrounding environment is as high as about 50° C. Further, a thermally assisted magnetic head has no space for disposing a temperature control system. Since a semiconductor laser is driven with constant current in performing thermally assisted recording, the temperature of the semiconductor laser increases. For this reason, a thermally assisted magnetic head is designed so that heat generated by the semiconductor laser is released into air via the slider when the slider flies up. This prevents the temperature of the semiconductor laser from exceeding 90° C. That is, a thermally assisted magnetic head gimbal assembly must be inspected for whether the temperature of the semiconductor laser being driven is as designed.

To manufacture the thermally assisted magnetic head disclosed in Japanese Unexamined Patent Publication No. 2006-185548, the light source unit must be overlaid on the surface (back surface) of the slider opposite to the surface thereof opposed to the medium and then held thereon. The slider including the magnetic head portion, and the light source unit are inspected independently and held if they are acceptable products. Thus, thermally assisted magnetic heads are manufactured with high yield. However, when inspecting the thermally assisted magnetic head gimbal assembly manufactured by combining the slider and the light source unit, the same result as when inspecting these elements independently are not always obtained. That is, Japanese Unexamined Patent Publication No. 2006-185548 includes no specific description about an evaluation of changes in electrical properties caused when the elements are coupled together or an evaluation of changes in optical properties caused by changes in the temperature of the light source unit when using the thermally assisted magnetic head gimbal assembly. Further, there is no description about inspection unit used when a trouble such as breakage of an element occurs during assembly of the thermally assisted magnetic head gimbal assembly.

For the thermally assisted magnetic head disclosed in Japanese Unexamined Patent Publication No. 2009-43377, optical properties during recording of a thermally assisted magnetic head gimbal assembly manufactured by combining the slider and the light source unit can be controlled by using a temperature sensor. That is, optical properties can be monitored by using the temperature sensor. However, there is a need to mount a temperature sensor on a single thermally assisted magnetic head gimbal assembly and couple wiring thereto. Further, the temperature sensor is intended to measure the temperature of the location at which it is disposed and cannot monitor the temperature of the light source unit, which is sensitive to the temperature.

As an example of another field, a method for evaluating temperature characteristics of a semiconductor laser alone will be described with reference to FIGS. 1 and 2. FIG. 1 shows the temperature dependence of injection current-light output characteristics (I-L characteristics) used as an index indicating the performance of a general semiconductor laser alone. I-L characteristics represent the relationship between forward current applied to a semiconductor laser and detected power. The temperature of the semiconductor laser is controlled using a Peltier heater element-embedded stage on which the semiconductor laser is disposed.

As is understood from FIG. 1, with increases in the temperature of the semiconductor laser, current required to obtain the same power becomes larger, that is, the I-L curve shifts toward higher current. Particularly, at temperatures of 90° C. or more, power versus current linearity is lost, causing saturation. Accordingly, when the temperature of the semiconductor laser becomes high in the thermally assisted magnetic head gimbal assembly, the desired power cannot be obtained. The current at which the laser oscillates and starts emitting power, that is, "threshold current" also shifts toward higher current as the temperature of the semiconductor laser increases. The main cause of such increases in threshold current is believed to be "reductions in gain." Since the increases in temperature cause band-injected electrons/holes to distribute high thermal energy, the number of electrons/holes conducive to oscillation is effectively reduced. Compensating for this reduced gain requires increasing the carrier density. Increasing the carrier density cause an increase in threshold current. For this reason, by noting the temperature dependence of the "threshold current" of the semiconductor laser as shown in FIG. 2 and obtaining a characteristic temperature $T_0$ as shown in the formula below, temperature characteristics of the semiconductor laser can be evaluated.

$$I_{th} = k \times \exp(T/T_0)$$

Ith represents the threshold current of the semiconductor laser; T represents the temperature of the semiconductor laser; and k represents a proportionality factor. It is understood that the threshold current $I_{th}$ exponentially increases along with the temperature T. A semiconductor laser having a higher characteristic temperature $T_0$ has less effect on the temperature and therefore can be regarded as having good temperature characteristics. For a thermally assisted magnetic head, however, the drive operation temperature acting as a surrounding environment is as high as about 50° C., and there is no space for disposing a temperature control system, as described above. The thermally assisted magnetic head is designed so that heat generated by the semiconductor laser is released into air via the slider when the slider flies up. Accordingly, when constant current is passed through the semiconductor laser in a state where there is almost no escape route for heat during assembly, the temperature of the semiconductor laser abruptly increases. In a thermally assisted magnetic head gimbal assembly, the semiconductor laser and the slider are used in their closeness to each other such that the distance therebetween is several μm. Accordingly, light reflected from the surface of the slider returns to the semiconductor laser. As a result, light-emitting characteristics of the semiconductor laser, for example, the threshold current or output power may change compared to those when inspecting the semiconductor laser alone. As seen, the amount of change in threshold current changes due to the distance between the semiconductor laser and the slider. This makes it difficult to accurately estimate the amount of temperature increase from the amount of change in threshold current.

An advantage of the present invention is to provide an apparatus and method for inspecting a thermally assisted magnetic head that can accurately identify a defective product with a simple operation.

A first aspect of the present invention provides a thermally assisted magnetic head inspection apparatus for inspecting a thermally assisted magnetic head. The thermally assisted magnetic head includes a magnetic head portion having an optical waveguide formed thereon, a semiconductor laser, and a sub-mount holding the semiconductor laser. The sub-mount is fixed to the magnetic head portion. Laser light emitted by the semiconductor laser enters the optical waveguide of the magnetic head portion. The thermally assisted magnetic head inspection apparatus includes: a spectrum analyzer configured to measure an oscillation wavelength of the semiconductor laser; a light transmission unit configured to lead light emitted by the semiconductor laser to the spectrum analyzer; and a calculator configured to calculate a temperature of the semiconductor laser on the basis of a wavelength obtained by the spectrum analyzer. The semiconductor laser is driven while changing a light-emitting time percentage. When the temperature of the semiconductor laser calculated by the calculator falls out of a preset temperature range, the thermally assisted magnetic head is identified as a defective product.

By changing the light-emitting time percentage of the semiconductor laser, the temperature can be controlled using Joule heating generated when driving the semiconductor laser, without requiring a temperature controller. Further, by using the oscillation wavelength for detection rather than using the threshold current, the temperature of the semiconductor laser can be obtained in such a manner that the effect of changes in threshold current is eliminated.

The light detection unit may be a focusing optical element and an optical fiber. Preferably, a Czerny-Turner spectroscope which uses a diffraction grating and array CCD sensor and includes no movable unit is used as the spectrum analyzer. This makes it possible to measure the wavelength even when the semiconductor laser is caused to emit light only for a short period of time during inspection. As a result, the possibility that the thermally assisted magnetic head may be broken during inspection can be reduced.

A second aspect of the present invention provides a method for inspecting a thermally assisted magnetic head. The thermally assisted magnetic head includes a magnetic head portion having an optical waveguide formed thereon, a semiconductor laser, and a sub-mount holding the semiconductor laser. The sub-mount being is fixed to the magnetic head portion. Laser light emitted by the semiconductor laser enters the optical waveguide of the magnetic head portion. The method includes: a first step of driving the semiconductor laser while changing a light-emitting time percentage and detecting a wavelength of emitted light; a second step of estimating a temperature of the semiconductor laser on the basis of the detected wavelength of the emitted light; a third step of, when the temperature of the semiconductor laser estimated in the second step falls out of a preset temperature range, identifying the thermally assisted magnetic head as a defective product.

According to the aspects of the present invention, a defective thermally assisted magnetic head can be identified accurately with a simple operation Problems, configurations, and effects other than those described above will be clarified in the description of the embodiments below.

BRIEF DESCRIPTION OF THE DRAWINGS

FIG. 26 is a flowchart showing processes of a method for inspecting a thermally assisted magnetic head.

DETAILED DESCRIPTION OF THE PREFERRED EMBODIMENTS

Figure 1:
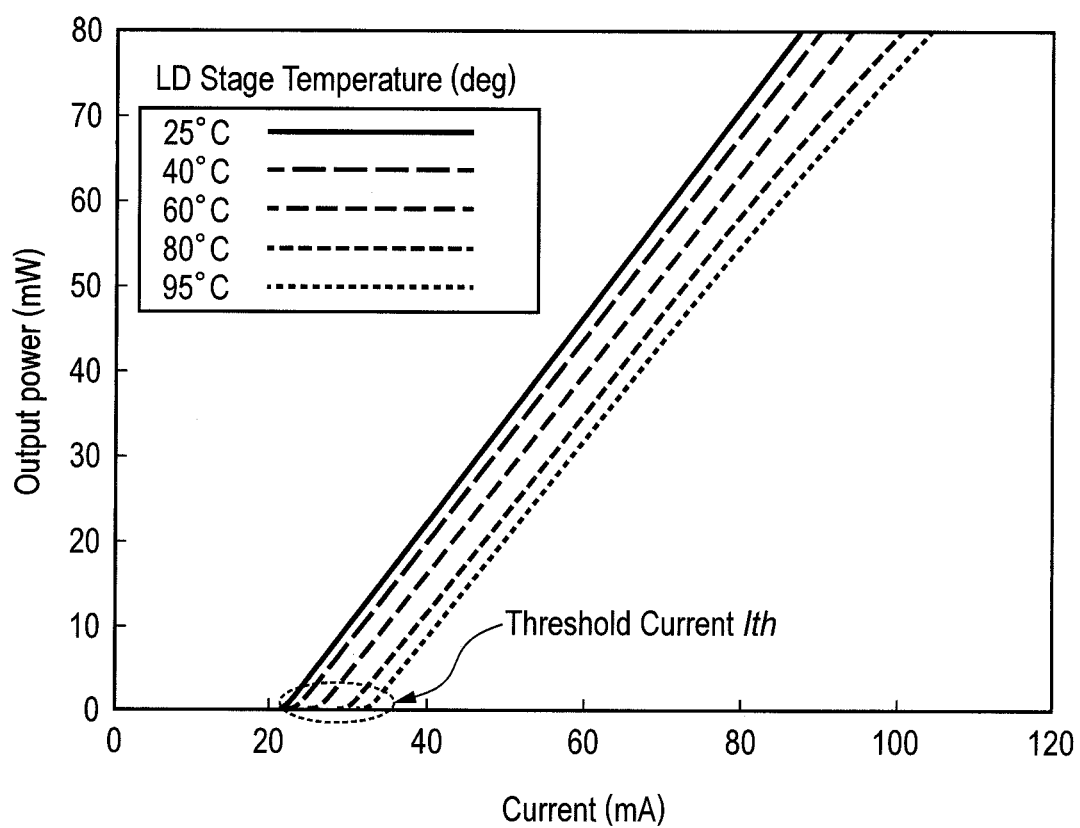
FIG. 1 is a graph showing the temperature dependence of I-L characteristics of a semiconductor laser.
Figure 2:
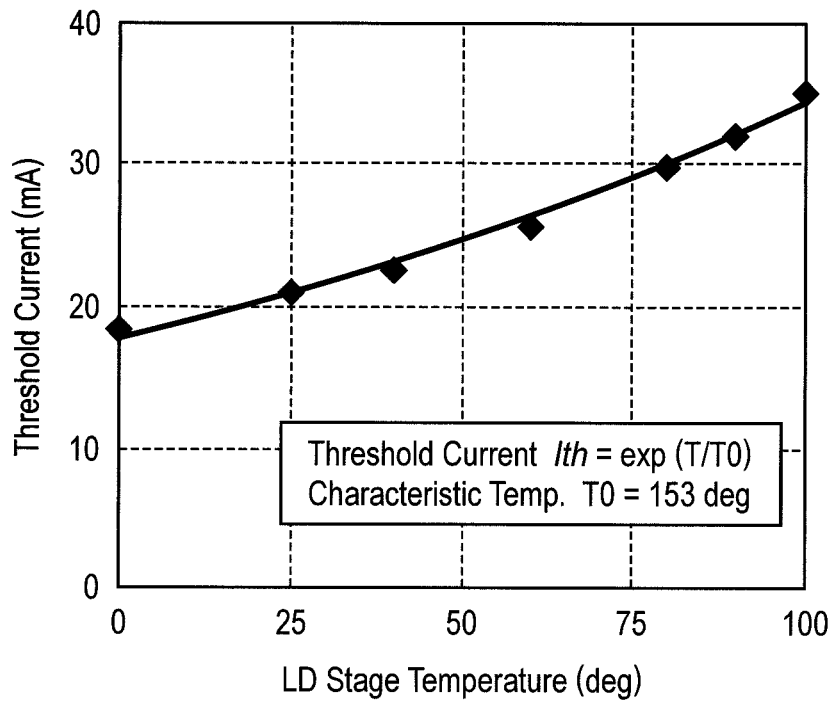
FIG. 2 is a graph showing the temperature dependence of the threshold current of the semiconductor laser.

Preferred embodiments of the present invention will be described with reference to the accompanying drawings. The same elements or elements having the same functions are given the same reference signs through the drawings and therefore will not be described repeatedly. The size ratios in and between the elements in the drawings are changed as appropriate so as to make it easy to understand the drawings.

Hereafter, a method for manufacturing a thermally assisted magnetic head gimbal and a method for inspecting the same will be described. A first embodiment is an example of a thermally assisted magnetic head gimbal assembly manufacturing apparatus including an inspection system; a second embodiment is an example of a thermally assisted magnetic head gimbal assembly inspection apparatus.

First Embodiment

Thermally Assisted Magnetic Head Gimbal Assembly Manufacturing Apparatus

[1] Configurations of Head Gimbal Assembly and Hard Disk Drive

Figure 3:
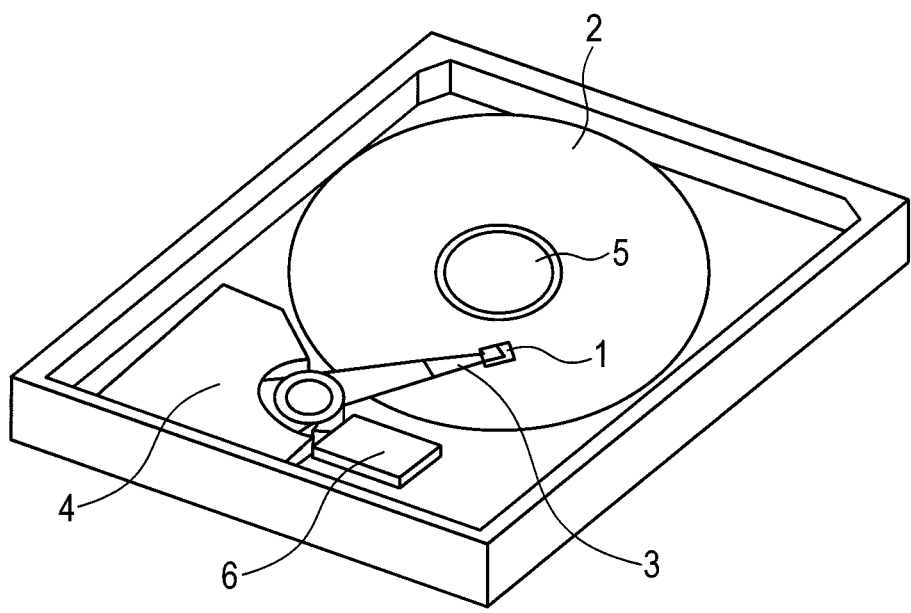
FIG. 3 is a schematic diagram showing an example configuration of a hard disk drive.

First, referring to FIG. 3, the configuration of a hard disk drive will be described. A semiconductor laser-equipped slider 1 is held by a suspension 3 and positioned on the desired track on a magnetic disk 2 by an actuator including a voice coil motor 4. A flying pad is formed on the head surface and flies to a fly height of 10 nm or less over the magnetic disk 2. The magnetic disk 2 is held and rotated by a spindle 5 which is rotated and driven by a motor. A semiconductor laser driver is disposed on a circuit substrate. A magnetic head driver is also mounted on the circuit substrate. Recording signals are generated by a signal processing LSI 6. Recording signals and a power supply for the semiconductor laser are provided to the semiconductor laser driver via a flexible printed circuit (FPC). At the moment of recording, a coil disposed in the semiconductor laser-equipped slider 1 is excited to generate a magnetic field. Simultaneously, the semiconductor laser emits light to make a recording mark. Data recorded on the magnetic disk 2 is played back by a magnetic playback element (GMR or TMR element) formed in the semiconductor laser-equipped slider 1. Playback signals are processed by a signal processing circuit.

In a head gimbal assembly (HGA), a thermally assisted magnetic head serving as the semiconductor laser-equipped slider 1 is mounted on the top of the suspension 3.

[2] Configuration of Thermally Assisted Magnetic Head

Figure 4:
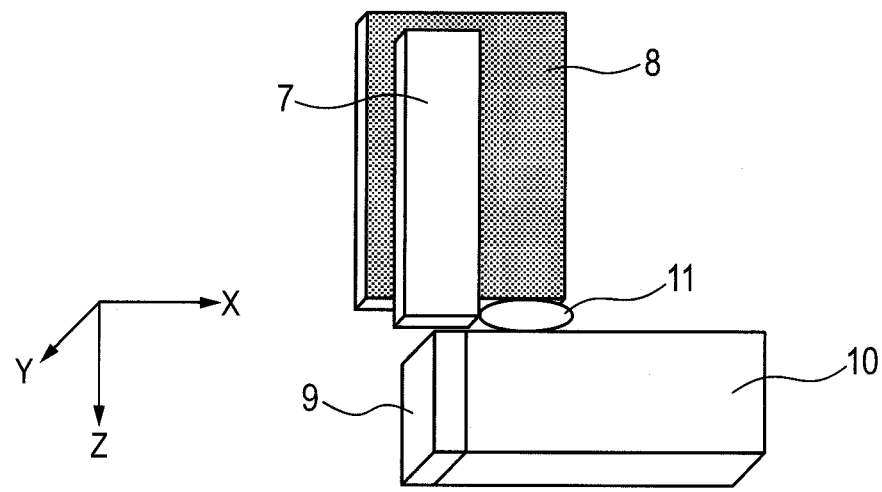
FIG. 4 is a schematic oblique view showing an example configuration of a thermally assisted magnetic head.

Next, referring to FIGS. 4 to 6, the configuration of the thermally assisted magnetic head will be described. As shown in FIG. 4, the thermally assisted magnetic head includes a slider and a light source unit. The slider includes a slider substrate 10 and a magnetic head portion 9 for writing or reading data signals. The light source unit includes a semiconductor laser 7 and a sub-mount 8 for holding the semiconductor laser 7. The slider substrate 10 or magnetic head portion 9 is bonded to the sub-mount 8 by an adhesive 11 such as a UV-curable epoxy resin or UV-curable acrylic resin.

[2.1] Slider

Figure 5:
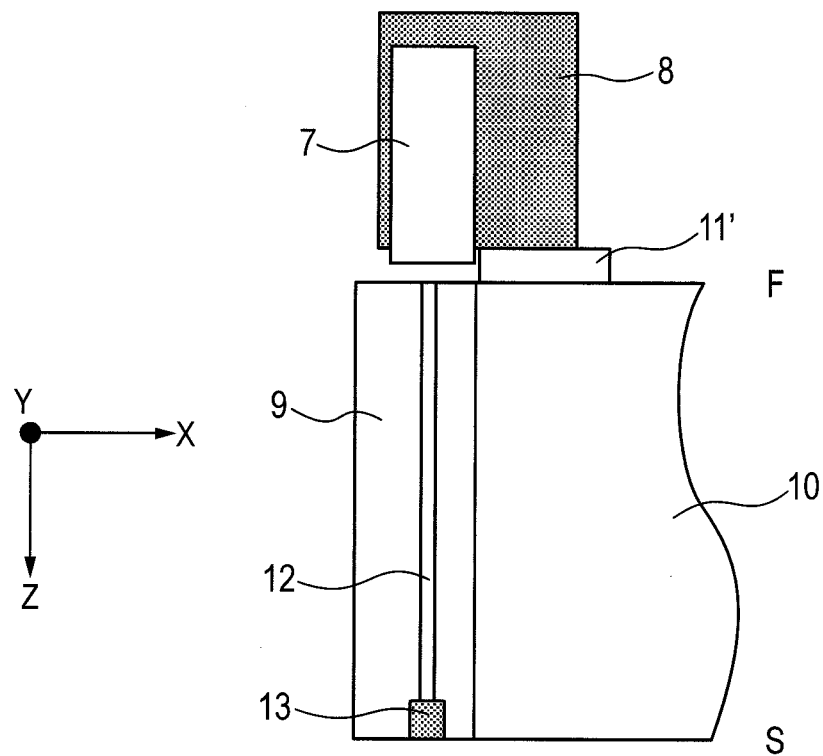
FIG. 5 is a schematic sectional view showing an example configuration of the thermally assisted magnetic head.

As shown in FIG. 5, the slider substrate 10 is planar. A medium-opposed surface S of the slider substrate 10 is formed into a predetermined shape so that the thermally assisted magnetic head can obtain an appropriate fly height. The slider substrate 10 can be formed of conductive AlTiC ($Al_2O_3$—TiC) or the like. Disposed adjacent to the medium-opposed surface S of the slider is a near-field light generator 13 that generates near-field light for heating the recording layer of the magnetic disk. Although not shown, an electromagnetic transducer is disposed adjacent to the near-field light generator 13. The electromagnetic transducer is formed by layering a recording element including a single-pole head; and a playback element including a CPP/GMR sensor element. The semiconductor laser 7 serving as a light emitting/introducing element (light source) is mounted over a back surface F opposite to the medium-opposed surface S of the slider with an cured adhesive 11' therebetween. The semiconductor laser 7 is fixed to the sub-mount 8 and emits light having a wavelength of 780 nm. Light emitted by the semiconductor laser 7 is applied to the near-field light generator 13 through an optical waveguide 12. In the optical waveguide 12, the perimeter of a core formed of $Ta_2O_5$ and having long sides of 500 nm, short sides of 300 nm, and a refraction index of 2.18 is covered by a clad formed of $SiO_2$ and having a refraction index of 1.5. Thus, the optical waveguide 12 becomes a single mode waveguide with respect to light having a wavelength of 780 nm. In the optical waveguide 12, the mode diameter of a guided wave is approximately the same as the size of the waveguide core. That is, the energy of the guided wave is substantially confined within the core.

The optical waveguide 12 is disposed between a reading head and a recording head. As shown in FIG. 5, the optical waveguide 12 extends from the medium-opposed surface S to the back surface F in such a manner that it is parallel with the integrated surface. Accordingly, one end surface of the optical waveguide 12 is exposed on the medium-opposed surface S. The other end surface thereof on the back surface F is opposed to the laser light emitting surface of the semiconductor laser 7. The back surface F is approximately parallel with the medium-opposed surface S. In this embodiment, $Ta_2O_5$ (refraction index=2.18) is used as the material for the core of the optical waveguide 12, and $SiO_2$ (refraction index=1.5) is used as the material for the clad. However, the core and clad may be formed of other materials, as long as the refraction index of the core is greater than that of the clad. For example, the core may be formed of $Al_2O_3$ (refraction index=1.6), $TiO_2$ (refraction index=2.4), or the like with respect to the clad formed of $SiO_2$ (refraction index=1.5). The clad may be formed of $MgF_2$ (refraction index=1.4) having a smaller refraction index than $SiO_2$. Alternatively, the core may be formed of $SiO_2$ which is doped with another material such as Ge.

The near-field light generator 13 is formed of gold (Au) and has a shape of an isosceles triangular prism having bottom sides of 100 nm, hypotenuses of 130 nm, and a height of 200 nm. The top of the isosceles triangular prism is formed into an arc having a curvature radius of about 10 nm. The spot diameter of generated near-field light is about 25 nm. To increase the coupling efficiency when light from the semiconductor laser 7 enters the optical waveguide 12, a spot-size converter or the like is preferably formed directly below the laser diode unit. The light coupled to the optical waveguide 12 is applied to the near-field light emitting element 13, which in turn generates near-field light on the surface of the magnetic disk on principles such as plasmon resonance. Thus, the temperature of the medium surface is increased. When the power of the light applied to the near-field light generator 13 according to this embodiment is about 10 mW, a local temperature of the magnetic film of the medium is increased to about 200° C. Simultaneously, the temperature of the near-field light generator 13 is also increased by about 150° C. Due to the effect of thermal scattering, the resistance of the near-field light generator 13 is increased.

[2.2] Light Source Unit

Figure 6:
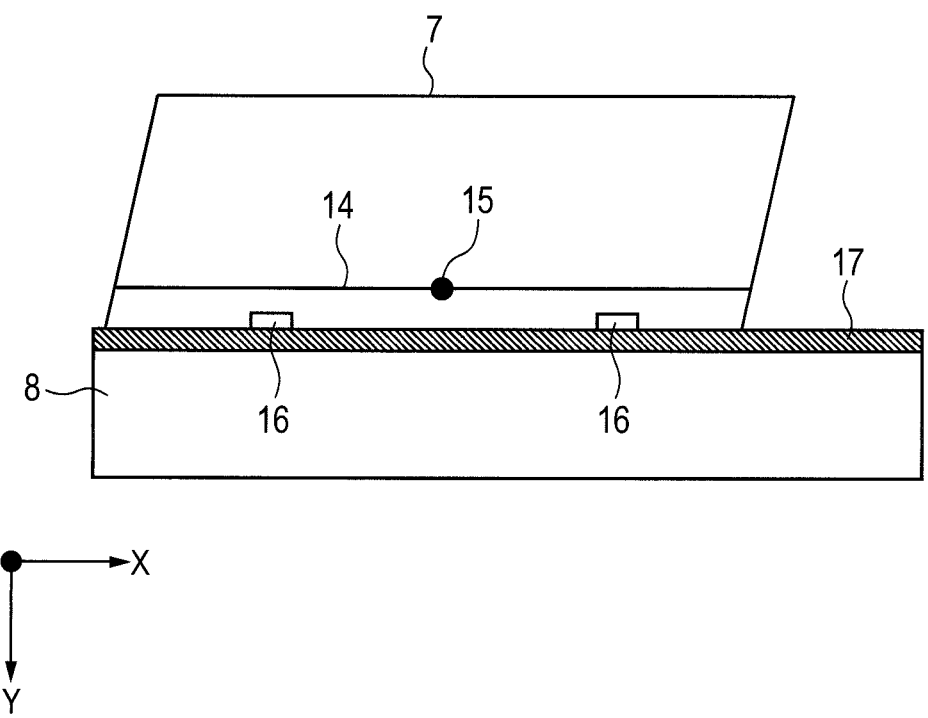
FIG. 6 is a schematic sectional view of a laser held by a sub-mount when seen from a surface opposed to the semiconductor laser.

As shown in FIG. 6, in the light source unit, the semiconductor laser 7 is fixed to the sub-mount 8. The semiconductor laser 7 has a shape of a rough rectangular parallelepiped. The sub-mount 8 is a conductor formed of AlTiC ($Al_2O_3$—TiC) or the like. The semiconductor laser 7 may be a multiple-quantum-well semiconductor laser for use in an optical information recording medium. In such a semiconductor laser, a reflective film 14 which is intended to excite oscillation by total reflection and which is formed of $SiO_2$, $Al_2O_3$, or the like is formed in front of or behind the cleavage plane of the multilayer structure. Another reflective film has an aperture formed at a position corresponding to an active layer thereon. The region corresponding to the aperture on the surface on which the reflective film 14 is formed serves as a light emission point 15 from which laser light is emitted. The semiconductor laser 7 configured as described above emits laser light from the light emission point 15 when a voltage is applied to the semiconductor laser 7 in the film thickness direction. The semiconductor laser 7 may be formed of another semiconductor material such as GaAlAs. A metalized layer 17 is disposed in order to physically fix the semiconductor laser 7 to the sub-mount 8, as well as to make electrical contact with the bottom of the semiconductor laser. It may be formed of a solder material such as AuSn.

The semiconductor laser 7 is formed by mounting, on the sub-mount 8, a chip obtained in a process such as cleavage. Accordingly, it often has a shape of not a rectangle but a parallelogram or parallelogram having rounded corners when viewed in a cross-section. For this reason, it is difficult to find the light emission point 15 using the external shape or any edge of the semiconductor laser 7 as a reference. For this reason, during alignment, mesa structures 16 which are recesses formed on the semiconductor laser 7 are used as references in order to find the light emission point 15 of the semiconductor laser 7. The light emission point 15 can be easily found by referring to the relative position between the mesa structures 16 serving as design parameters and the light emission point 15. A wavelength λ of emitted laser light is, e.g., the order of 780 nm to 850 nm. Note that there exists an appropriate excitation wavelength corresponding to the metal material for the near-field light generator 13 and that attention must be paid to the design wavelength of the light waveguide. While the wavelength λ is set to, e.g., 780 nm in this embodiment so that it matches the design wavelength of the light waveguide, the inventors have confirmed that this wavelength also operates in the near-field light generator 13 which contains Au.

For the sizes of the semiconductor laser 7, the width may be set to, e.g., the order of 200 to 350 µm; the length to, e.g., the order of 200 to 400 µm; and the thickness to, e.g., the order of 60 to 200 µm. The width of the semiconductor laser 7 may be reduced to as small as about 100 µm, using, as the lower limit, the distance between the opposite edges of a current blocking layer. The length of the semiconductor laser 7 is related to the current density and therefore cannot be reduced too much. In any case, the semiconductor laser 7 preferably has enough sizes in view of handling ease during mounting thereof. However, the length of the semiconductor laser acts as a parameter for determining the thickness of the entire slider. Further, no light source support substrate other than the sub-mount is used in this embodiment. Accordingly, it is difficult to increase the length to 400 µm or more in terms of fly characteristics of the slider. In this embodiment, the semiconductor laser 7 has a width of 200 µm, a length of 250 µm, and a thickness of 100 µm.

[3] Apparatus and Method for Manufacturing Thermally Assisted Magnetic Head Gimbal Assembly Next, referring to FIGS. 7 to 23, an apparatus and method for manufacturing a thermally assisted magnetic head gimbal assembly will be described. First, the slider including the magnetic head portion 9 configured as described above and the semiconductor laser 7 fixed to the sub-mount 8 configured as described above are manufactured. Subsequently, the magnetic head portion 9 and the semiconductor laser 7 are aligned using a thermally assisted magnetic head manufacturing apparatus described below, in accordance with flowcharts shown in FIGS. 21 to 23.

Figure 7:
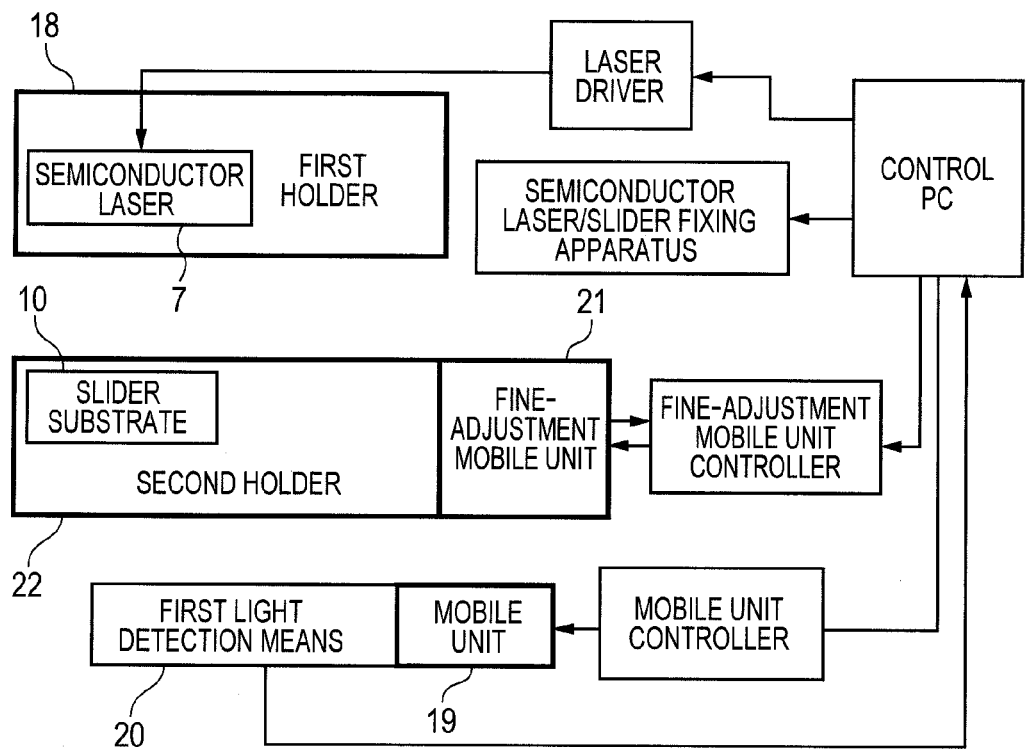
FIG. 7 is a block diagram showing an example configuration of a thermally assisted magnetic head gimbal assembly manufacturing apparatus during assembly.

As shown in a block diagram of FIG. 7, the thermally assisted magnetic head gimbal assembly manufacturing apparatus holds the semiconductor laser 7 fixed to the sub-mount 8, using a first holder 18 for holding a sub-mount. A second holder 22 for holding the slider 10 includes a fine-adjustment mobile unit 21 for adjusting the angle and position of the second holder 22 and a fine-adjustment mobile unit controller. This apparatus can detect the position of the optical waveguide 12 formed on the magnetic head portion 9 by using the fine-adjustment mobile unit 21.

This apparatus also includes first light detection unit 20 configured to monitor light emitted by the semiconductor laser 7. The first light detection unit 20 includes a mobile unit 19 for adjusting the position of the first light detection unit 20, and a mobile unit controller. In this embodiment, an image sensor such as a CCD is used as the first light detection unit 20. Use of the image sensor allows observation of the light spot position and light spot shape of the semiconductor laser 7. Analysis of the observation result allows detection of the relative position and inclination between the first light detection unit 20 and the semiconductor laser 7.

A control PC calculates a signal of the first light detection unit 20 and controls the mobile unit controllers for assembly. First to third calculators are installed in the control PC in the form of software. The first calculator detects the spot of the semiconductor laser 7 held by the first holder 18 using the first light detection unit 20. Further, by moving the first light detection unit 20 using the mobile unit 19, the first calculator controls the relative position between the first holder 18 holding the semiconductor laser 7, and the first light detection unit 20. Subsequently, using each luminance distribution data obtained by the first light detection unit 20, the first calculator calculates information indicating the relative position and inclination between the first light detection unit 20 whose positional relationship with the first holder 18 is previously modified, and the semiconductor laser 7. The second calculator moves the slider using the fine-adjustment mobile unit 21 and calculates position information of the optical waveguide 12 disposed on the magnetic head portion with respect to the semiconductor laser 7 using the luminance data at each position obtained by the first light detection unit 20. The third calculator drives the semiconductor laser 7 while changing the light-emitting time percentage and calculates the temperature of the semiconductor laser 7 on the basis of the oscillation wavelength of the semiconductor laser 7 measured using the spectrum analyzer.

In the first embodiment, a thermally assisted magnetic head is manufactured using the above-mentioned thermally assisted magnetic head gimbal assembly manufacturing apparatus in first to third processes described below. Subsequently, a thermally assisted magnetic head gimbal assembly is manufactured in a fourth process and then inspected in fifth and sixth processes. Respective manufacturing methods will be described in detail below.

[3.1] First Process

Figure 8:
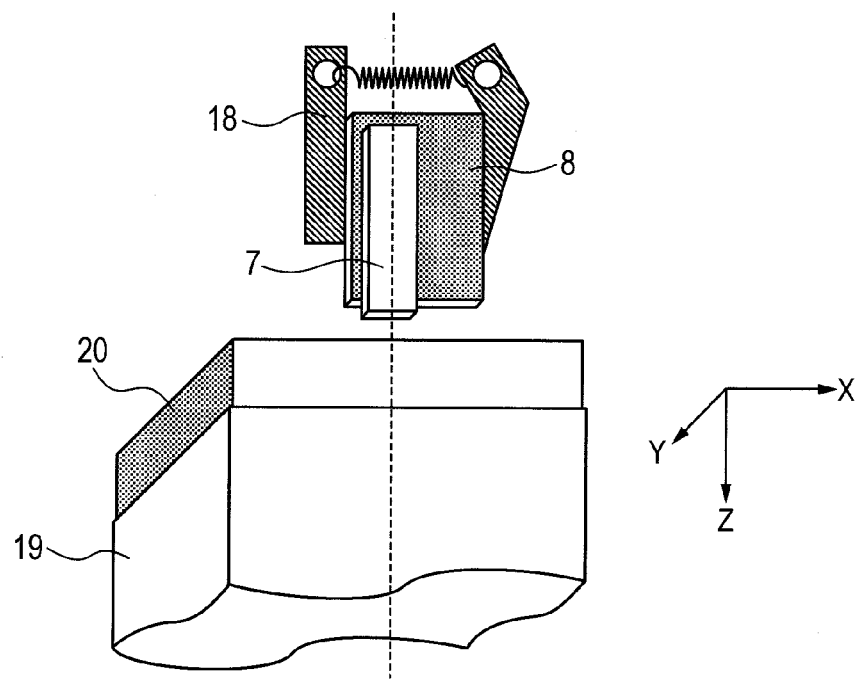
FIG. 8 is a schematic oblique view showing an example configuration of the thermally assisted magnetic head gimbal assembly manufacturing apparatus during alignment between the laser and light detection unit.
Figure 21:
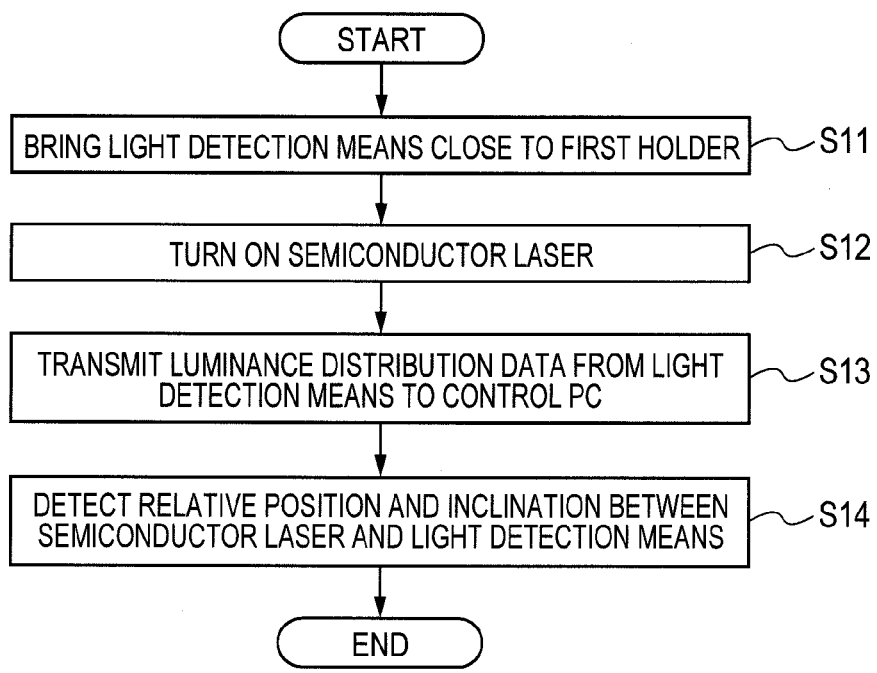
FIG. 21 is a flowchart showing the first process of a method for manufacturing a thermally assisted magnetic head gimbal assembly.

As shown in FIG. 8, the first process shown in FIG. 21 is performed with the second holder 22 withdrawn.

The image sensor serving as the first light detection unit 20 is brought close to the semiconductor laser 7 held by the first holder 18 using the mobile unit 19 (S11). This is performed as follows: the control PC makes an instruction to the mobile unit controller; and the mobile unit controller drives the mobile unit 19 in accordance with the instruction. Subsequently, the control PC drives the laser driver to turn on the semiconductor laser 7 (S12). The first light detection unit 20 detects the spot of light emitted by the semiconductor laser 7 and transmits luminance distribution data obtained from the spot, to the control PC (S13). In the steps shown in FIGS. 9A to 9C, the control PC detects the relative position and inclination between the semiconductor laser 7 and the first light detection unit 20 using the first calculator (S14).

Figure 9A:
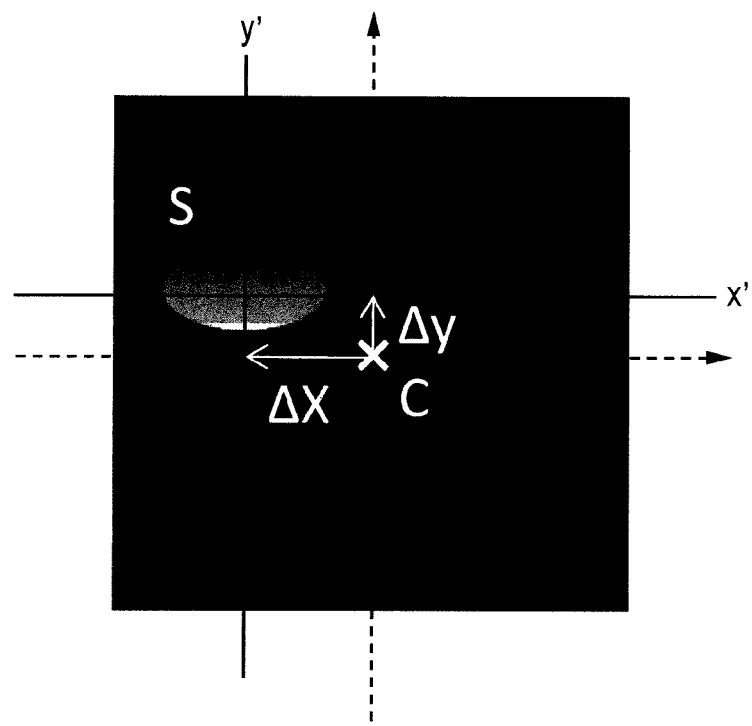
FIG. 9A is a diagram showing a light amount distribution detected in one step of a first process.

First, as shown in FIG. 9A, a light amount distribution on the first light detection unit 20 is obtained when the semiconductor laser 7 is turned on in an initial state. A spot S of light emitted by the semiconductor laser 7 is observed at a position displaced from a center C on the first light detection unit 20. The relative position and inclination between the first light detection unit 20 in an initial state and the first holder 18 holding the semiconductor laser 7 are controlled by calibrating the apparatus. The spot S of light emitted from the semiconductor laser 7 observed by the first light detection unit 20 is in the shape of an ellipse. This is because the beam expansion angle varies between the direction parallel with the reflective layer of the semiconductor laser and the direction perpendicular thereto in principle. The semiconductor laser 7 is usually slightly inclined with respect to the light receiving surface of the first light detection unit 20. The reason is that the handling of the semiconductor laser 7 by the first holder 18 varies according to unevenness in the external sizes of semiconductor lasers. For this reason, the luminance distribution of the spot S of light emitted by the semiconductor laser 7 is observed not as a point symmetrical distribution with the peak luminance point as the center but as an inclined distribution. In this state, the first calculator of the control PC can detect a relative position $\Delta x$, $\Delta y$ between the center C of the first light detection unit 20 and the spot S of light emitted by the semiconductor laser 7.

Figure 9B:
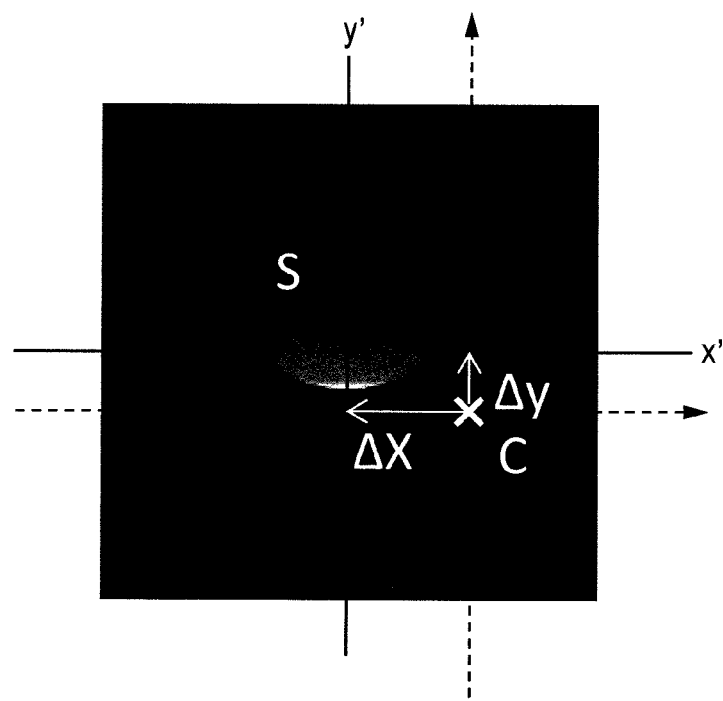
FIG. 9B is a diagram showing a light amount distribution detected in another step of the first process.
Figure 9C:
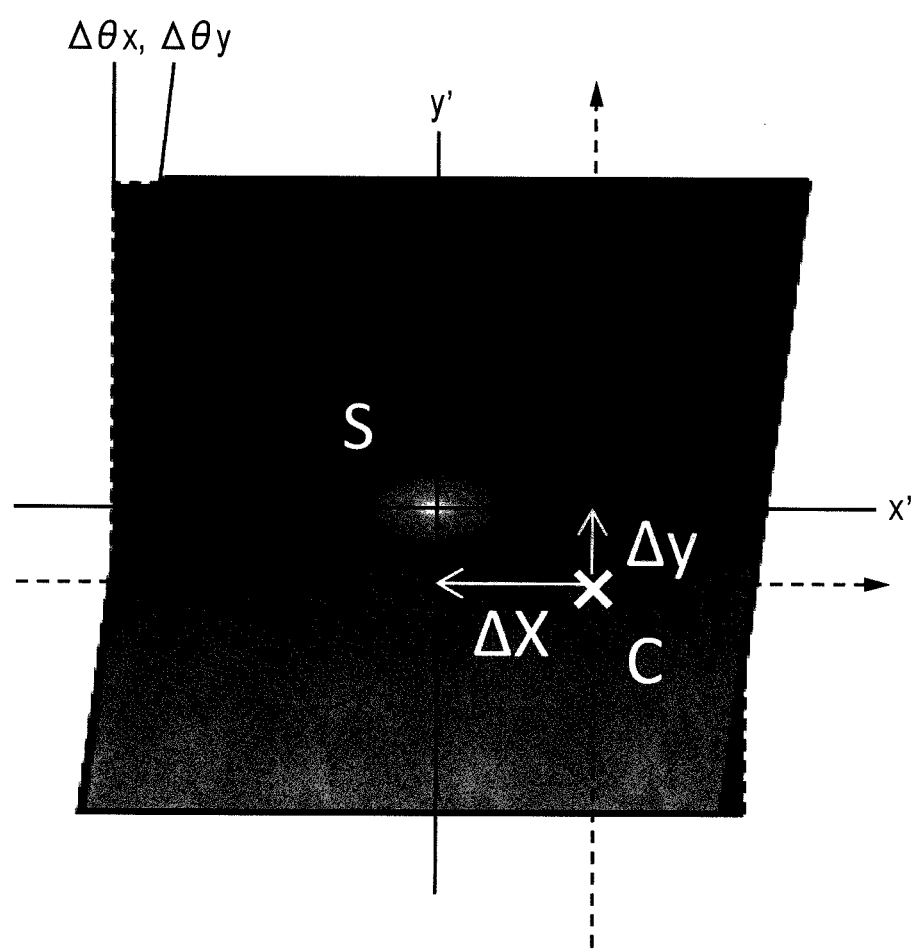
FIG. 9C is a diagram showing a light amount distribution detected in yet another step of the first process.

Subsequently, as shown in FIG. 9B, the mobile unit 19 is moved so that the spot S of light emitted by the semiconductor laser 7 comes to the center of the light receiving surface of the first light detection unit 20. Subsequently, as shown in FIG. 9C, the light receiving surface of the first light detection unit 20 is inclined using the mobile unit 19 by $\Delta\theta x$, $\Delta\theta y$. Thus, the luminance distribution of the spot S of light emitted by the semiconductor laser 7 can be adjusted so as to be point symmetrical with respect to the peak luminance point.

At this time, the relative inclination between the light receiving surface of the first light detection unit 20 and the spot S of light emitted by the semiconductor laser 7 can be detected as being $-\Delta\theta x$, $-\Delta\theta y$.

[3.2] Second Process

Figure 10:
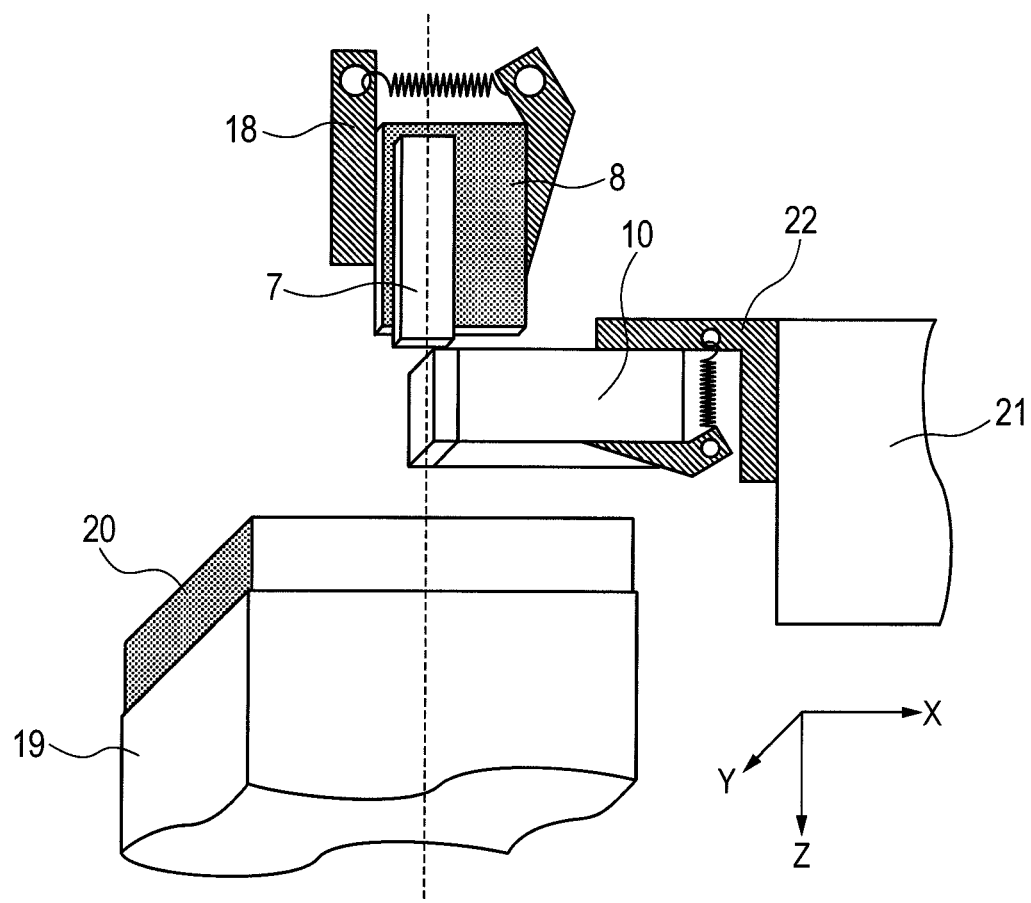
FIG. 10 is a schematic oblique view showing an example configuration of the thermally assisted magnetic head during assembly.
Figure 22:
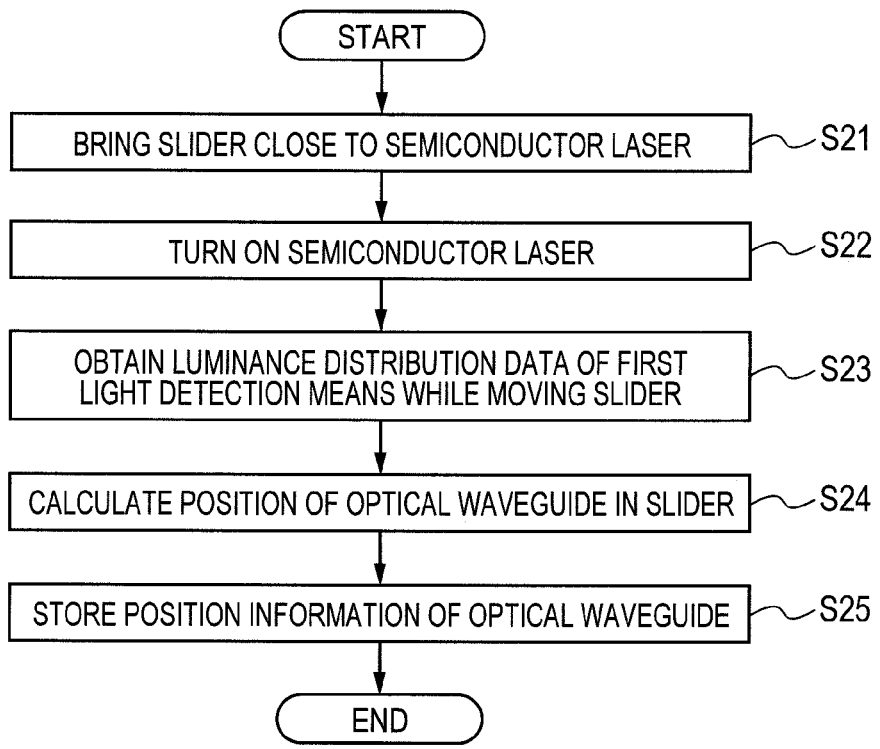
FIG. 22 is a flowchart showing a second process of the method for manufacturing a thermally assisted magnetic head gimbal assembly.

As shown in FIG. 10, unlike the first process, the second process shown in FIG. 22 is performed with the second holder 22 inserted.

The slider substrate 10 (magnetic head portion 9) held by the second holder 22 is brought close to the semiconductor laser 7 fixed to the first holder 18 using the fine-adjustment mobile unit 21 (S21). This is performed as follows: the control PC makes an instruction to the fine-adjustment mobile unit controller; and the fine-adjustment mobile unit controller drives the fine-adjustment mobile unit 21 to move the second holder 22 in accordance with that instruction. Subsequently, the control PC drives the laser driver to turn on the semiconductor laser 7 (S22). The first light detection unit 20 obtains the amount of emitted light that has passed through the slider. Subsequently, the first light detection unit 20 transmits the obtained luminance distribution data to the control PC while moving the slider substrate 10 held by the second holder 22 using the fine-adjustment mobile unit 21. The control PC obtains a detected maximum light amount distribution as shown in FIG. 11 using the maximum luminance data of the received luminance distribution data and the position information of the fine-adjustment mobile unit 21 (S23).

Figure 11:
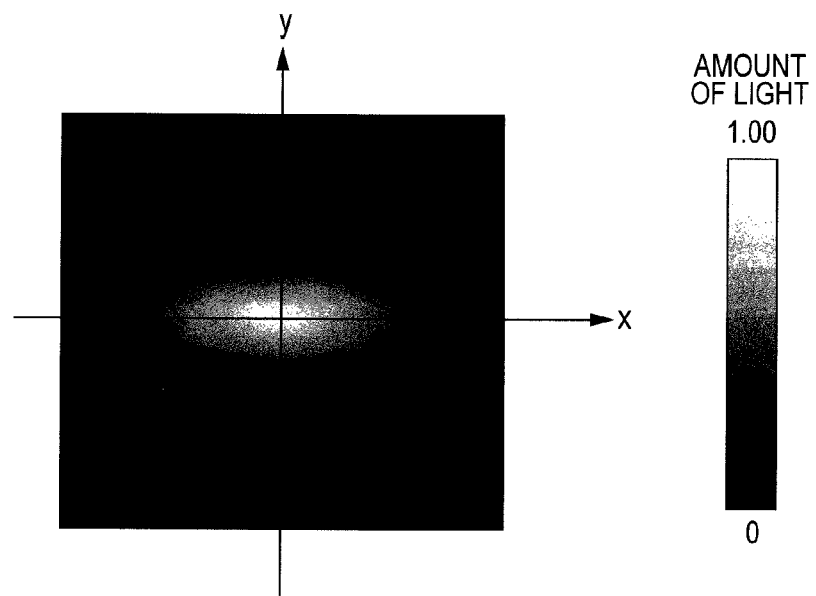
FIG. 11 is a diagram showing a detected maximum light amount distribution obtained using the first light detection unit.

As shown in FIG. 11, a region having a shape roughly similar to the light amount distribution of the semiconductor laser is found in the detected maximum light amount distribution. This occurs for the following reason: a displacement between the slider and the semiconductor laser reduces the spot light amount in the vicinity of the light waveguide; therefore, the amount of light coupled to the light waveguide disposed in the slider is also reduced; and as a result, the maximum amount of light that passes through the slider is reduced as well. That is, the position at which the detected maximum light amount distribution is maximized as shown in FIG. 11 is calculated as being a position at which the slider and the semiconductor laser are aligned (S24). The control PC stores information indicating the calculated coordinates (x,y) of the optical waveguide 12 in memory (S25).

[3.3] Third Process

Figure 23:
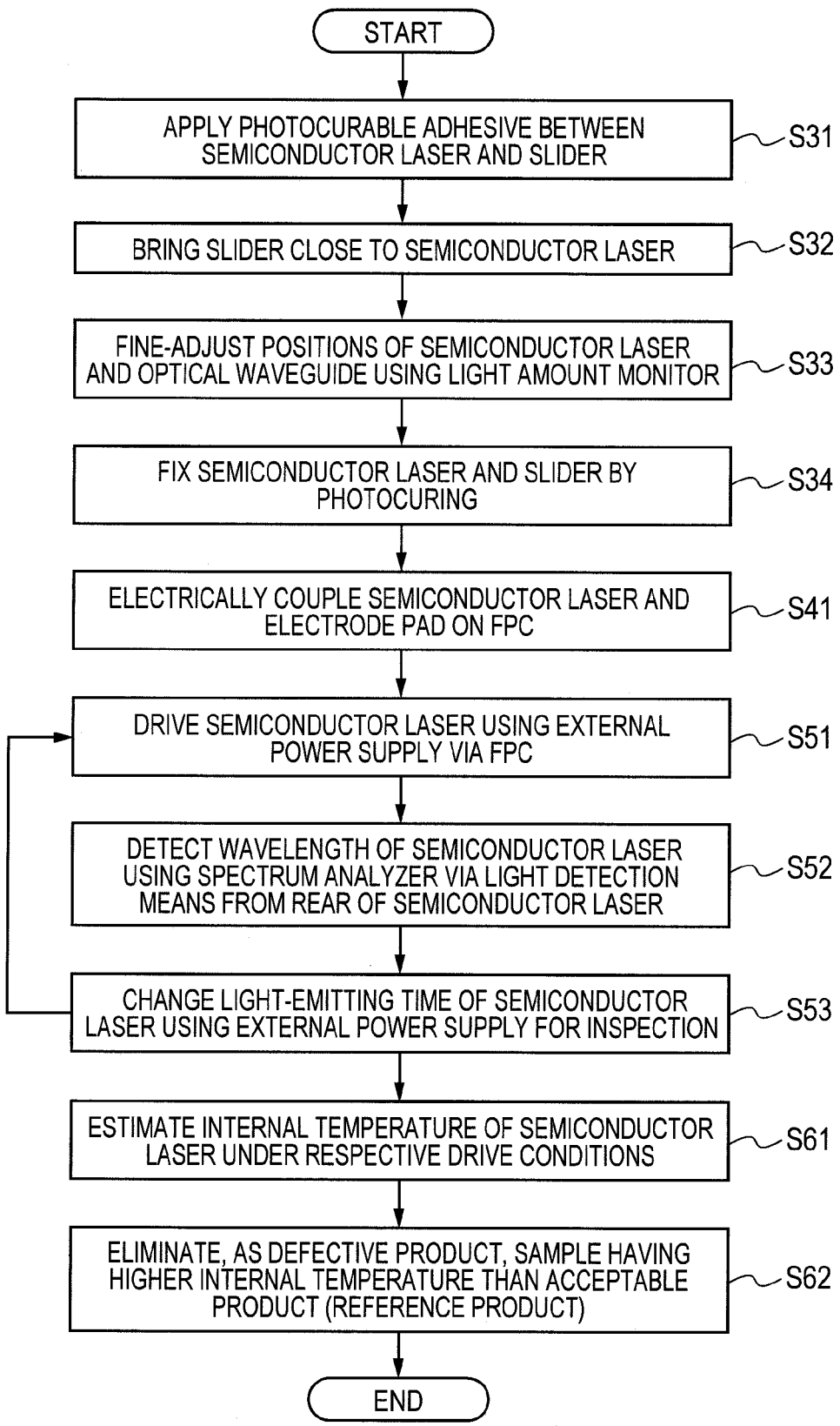
FIG. 23 is a flowchart showing third to sixth processes of the method for manufacturing a thermally assisted magnetic head gimbal assembly.

The third process shown in part of FIG. 23 is performed using a semiconductor laser/slider fixing apparatus shown in FIG. 7.

After determining the relative position and inclination between the semiconductor laser and the slider in the first and second processes, a UV-curable adhesive that becomes the adhesive 11 when cured is applied to the back surface of the slider 10 and the adhesion surface of the sub-mount 8, as shown in FIG. 5 (S31). Examples of the UV-curable adhesive include a UV-curable epoxy resin and a UV-curable acrylic resin.

Subsequently, the slider 10 is brought close to the semiconductor laser 7 held by the sub-mount 8 using the fine-adjustment mobile unit (S32). Subsequently, the amount of light entering the near-field light emitting element 13 out of the optical waveguide 12 is monitored using a temperature detector disposed on the near-field light generator 13. The alignment between the magnetic head and the semiconductor laser is fine adjusted so that the detected light amount is maximized, that is, so that the light emission point of the semiconductor laser 7 overlaps the optical waveguide 12. At that position, the adhesion surface of the sub-mount 8 is overlaid on the back surface of the slider substrate 10 (S33). Subsequently, ultraviolet rays are applied to the UV-curable adhesive from outside to cure the UV-curable adhesive, bonding the slider 10 and the sub-mount 8 together. In this way, a thermally assisted magnetic head is manufactured (S34).

[3.4] Fourth Process

Figure 12:
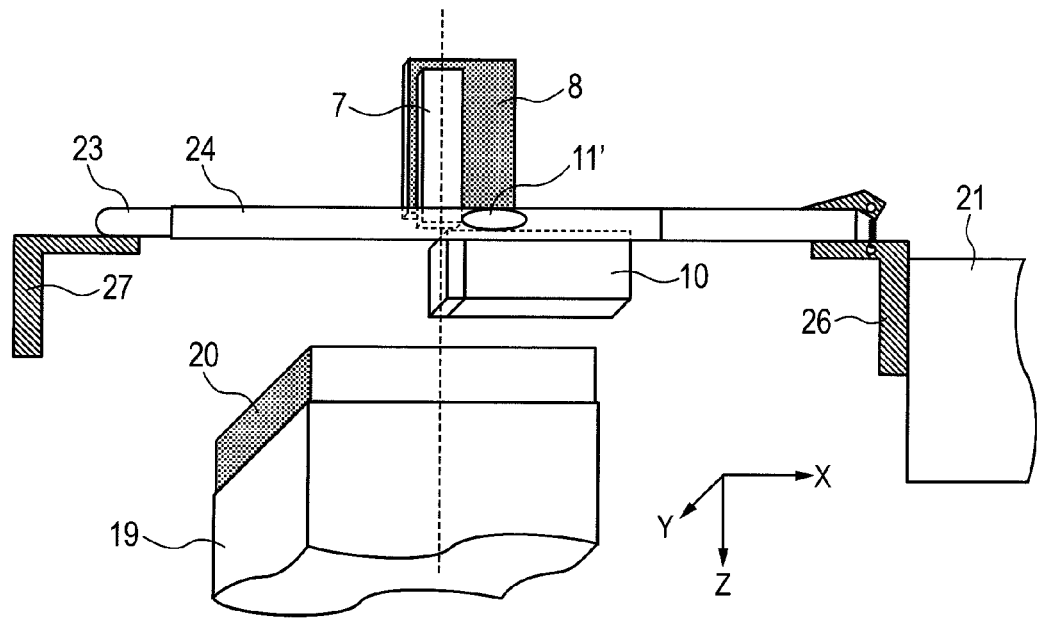
FIG. 12 is a schematic oblique view showing an example configuration of a thermally assisted magnetic head gimbal assembly during assembly.

In the fourth process shown in part of FIG. 23, the thermally assisted magnetic head manufactured in the third process is assembled with a suspension 24, including a load beam 23, and an FPC (not shown), as shown in FIG. 12. The suspension 24 is held by a third holder 26. In the fourth process, the suspension 24 is fixed by holding the load beam 23 provided at an end of the suspension 24 having characteristics of a spring using a clamp 27.

Figure 13:
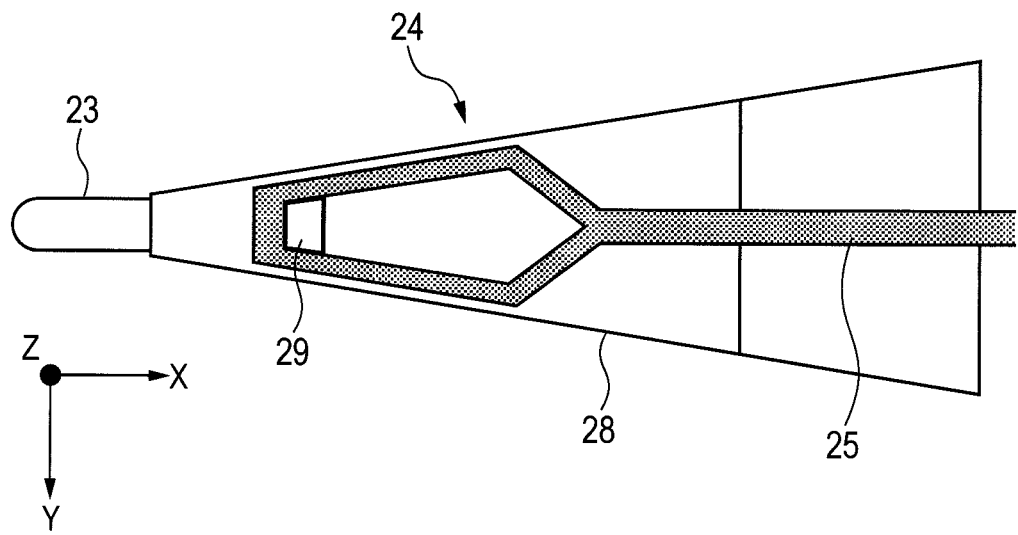
FIG. 13 is a schematic plan view of a suspension used to assemble the thermally assisted magnetic head gimbal assembly.

FIG. 13 shows a schematic plan view of the suspension 24 for a thermally assisted magnetic head gimbal assembly. The suspension 24 includes the load beam 23, an FPC 25 for electrically coupling the slider fixed to the end of the suspension to the hard disk drive, and an elastic flexure 28. The suspension 24 has a laser mounting hole 29 used to fix the semiconductor laser 7 to the slider. Using space in the laser mounting hole 29, the semiconductor laser 7 mounted on the sub-mount 8 as shown in FIG. 5 is fixed in such a manner that the semiconductor laser 7 stands erect on the slider 10.

Figure 14:
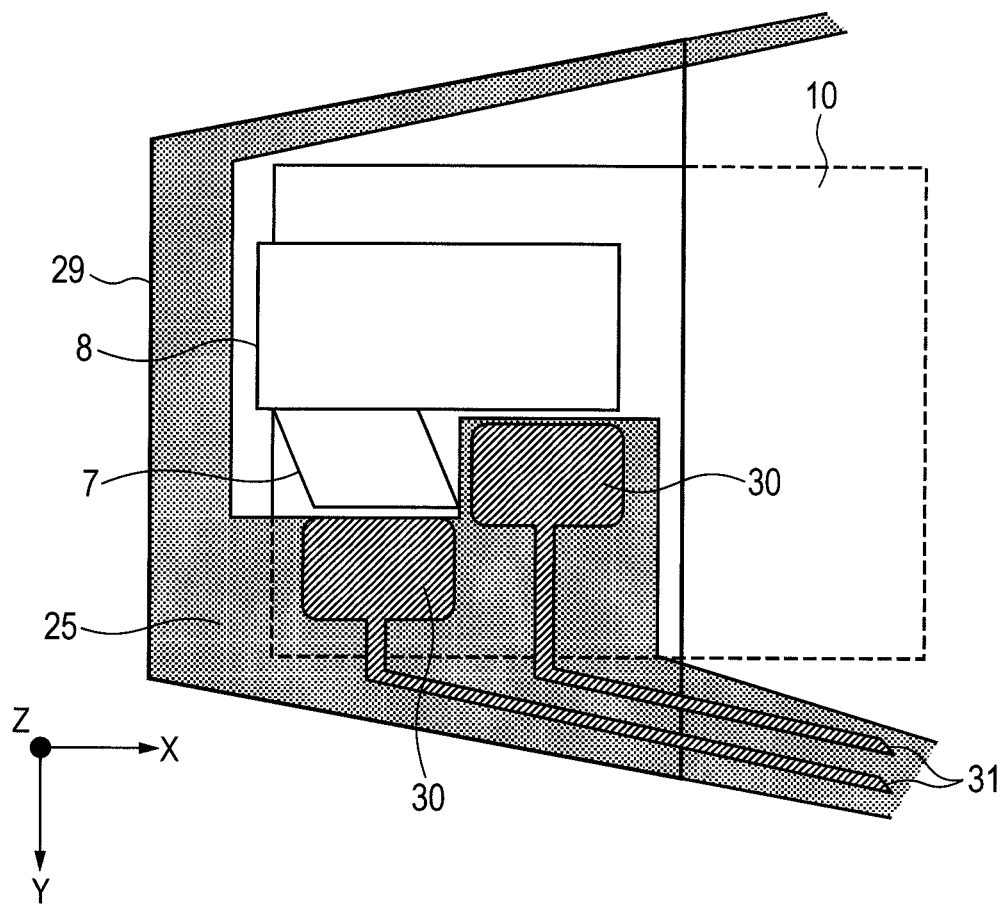
FIG. 14 is a schematic diagram showing the fixing positional relationship between the laser held by the sub-mount and an FPC in the vicinity of a laser mounting hole made on the suspension.
Figure 15:
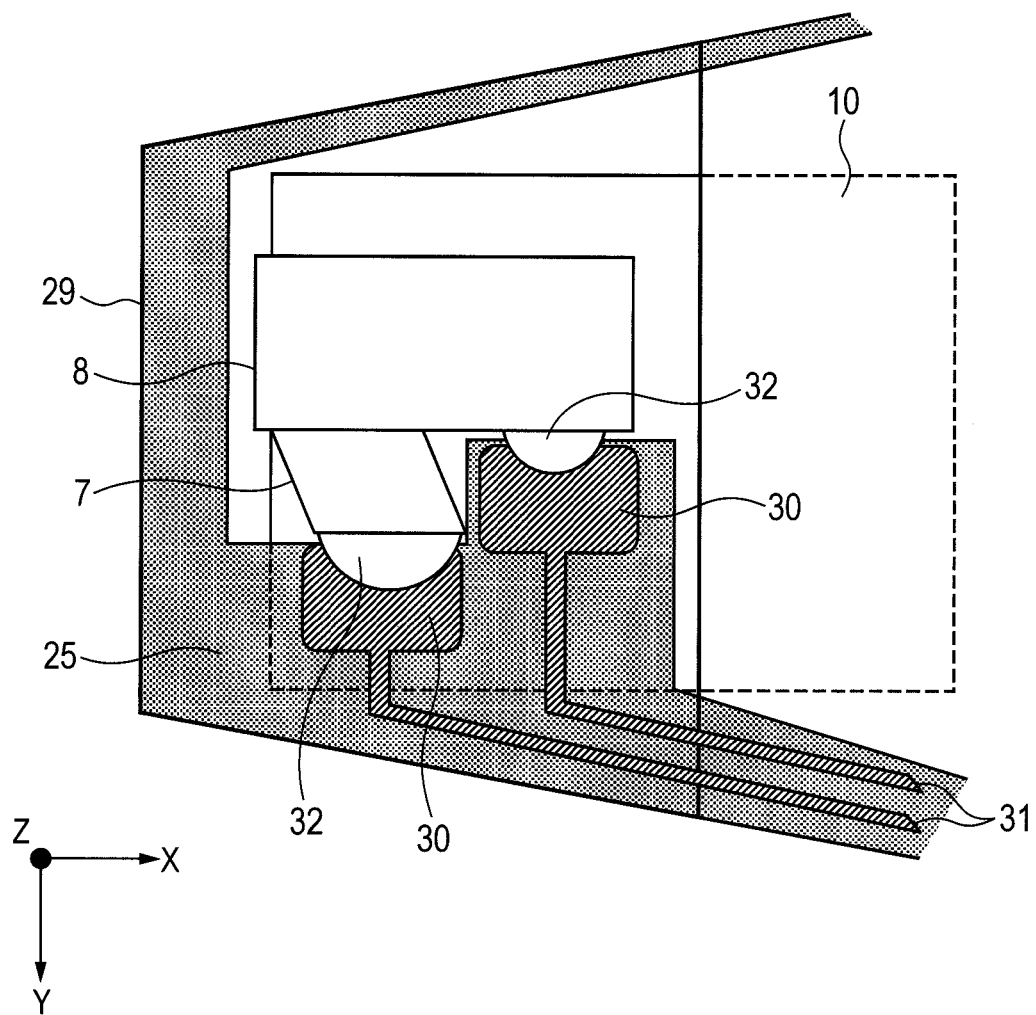
FIG. 15 is a schematic diagram showing the electrical connection and positional relationship between the laser and the sub-mount holding the laser, and the FPC.

FIG. 14 shows an enlarged view of the vicinity of the laser mounting hole 29 shown in FIG. 11. The sub-mount 8 and the semiconductor laser 7 are disposed adjacent to electrode pads 30 disposed on the FPC 25. The electrode pads 30 are coupled to the hard disk drive via leader lines 31. As shown in FIG. 15, the sub-mount 8 and the semiconductor laser 7 are coupled to the electrode pads 30 disposed on the FPC 25 via conductive cured objects 32 (S41).

[3.5] Fifth and Sixth Processes

Figure 16:
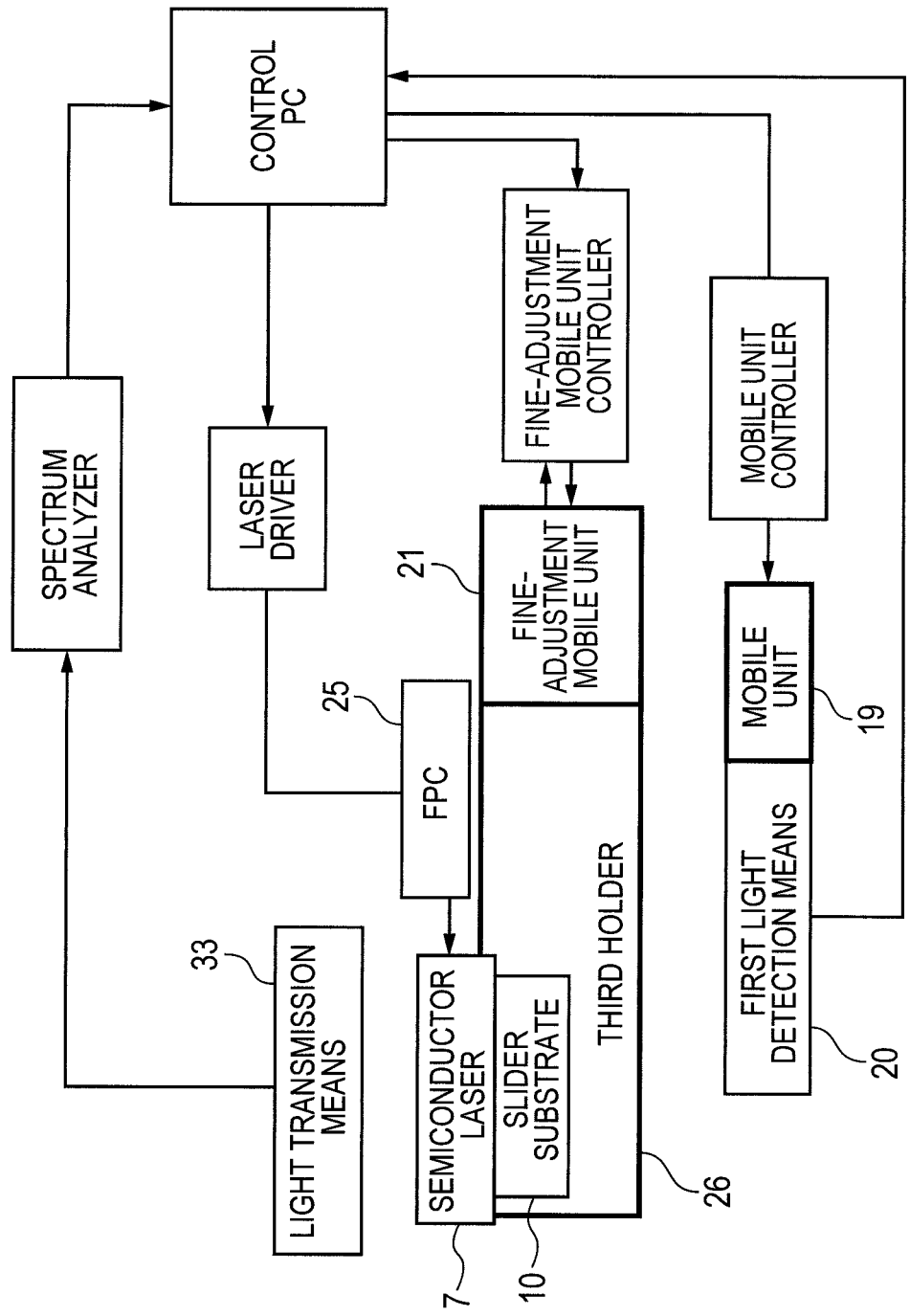
FIG. 16 is a block diagram showing an example configuration of the thermally assisted magnetic head under inspection.

As shown in the block diagram FIG. 16, the fifth and sixth processes shown in part of FIG. 23 are performed with light transmission means 33 brought close to the rear of the semiconductor laser 7.

Figure 17:
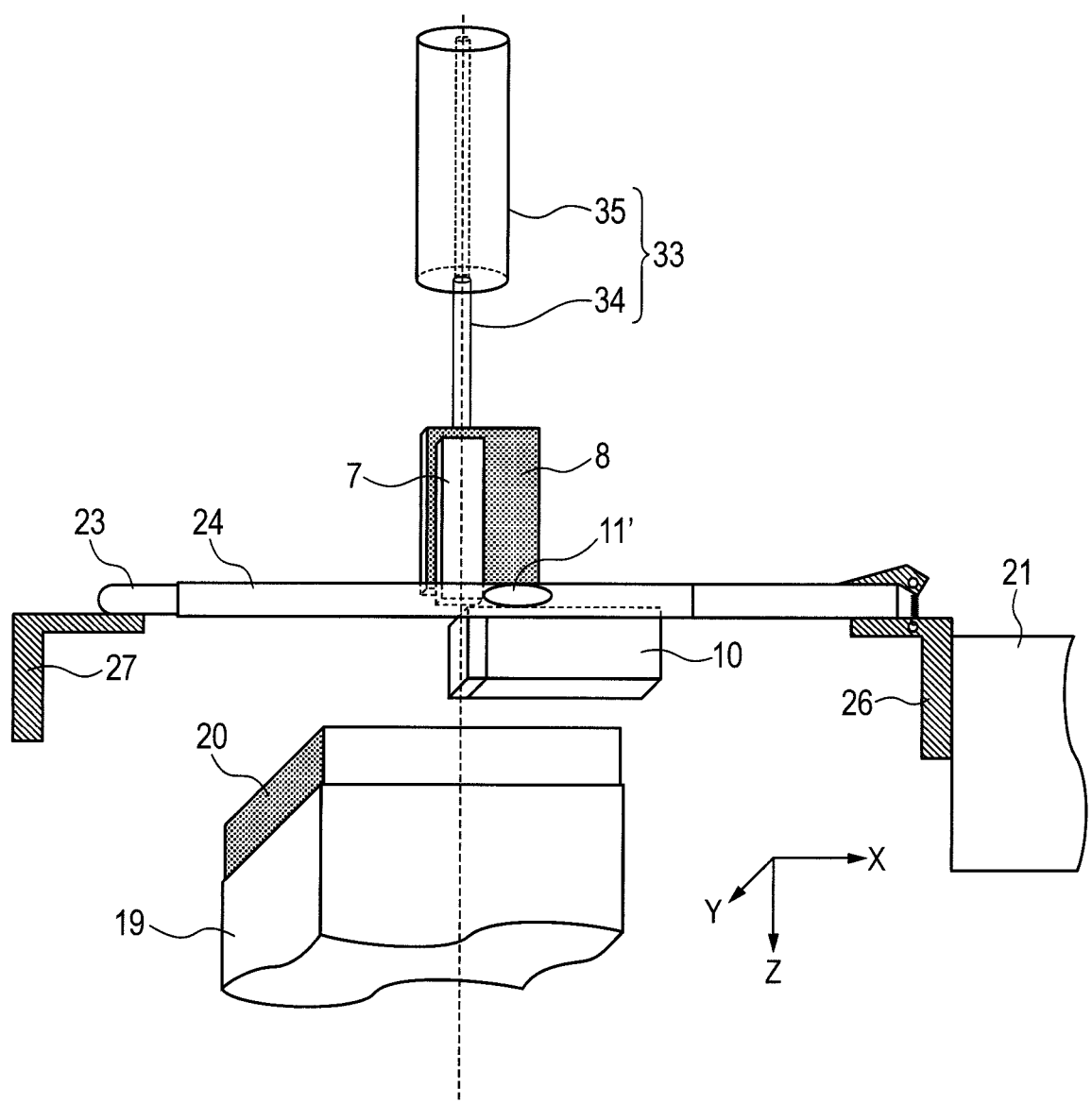
FIG. 17 is a schematic oblique view showing an example configuration of the thermally assisted magnetic head under inspection.

As shown in FIG. 17, the thermally assisted magnetic head gimbal assembly manufacturing apparatus holds the thermally assisted magnetic head gimbal assembly at the third holder 26 during inspection. As shown in FIG. 17, this apparatus drives the semiconductor laser 7 using an external power supply via the FPC 25 (S51); obtains light emitted from the semiconductor laser 7 by bringing the light transmission means 33 close to the rear of the semiconductor laser 7; and measures the oscillation wavelength of the semiconductor laser 7 using the spectrum analyzer (S52). In this embodiment, an optical fiber 34 is used as the light transmission means 33. Use of the optical fiber 34 having a diameter of 1 cm or less, including the thickness of an optical fiber coating 35, allows the light transmission means 33 to be easily brought close to the rear of the semiconductor laser 7. Thus, light emitted from the semiconductor laser 7 can be obtained from the side of the semiconductor laser 7 remote from the slider substrate 10. This facilitates addition of an inspection system to existing manufacturing apparatuses. If a Czerny-Turner spectroscope which uses a diffraction grating and an array CCD sensor and includes no movable part is used as the spectrum analyzer, the wavelength can be measured by causing the semiconductor laser to emit light only for a short period of time during inspection. Thus, the possibility that the thermally assisted magnetic head gimbal assembly may be broken during inspection can be reduced.

Figure 18:
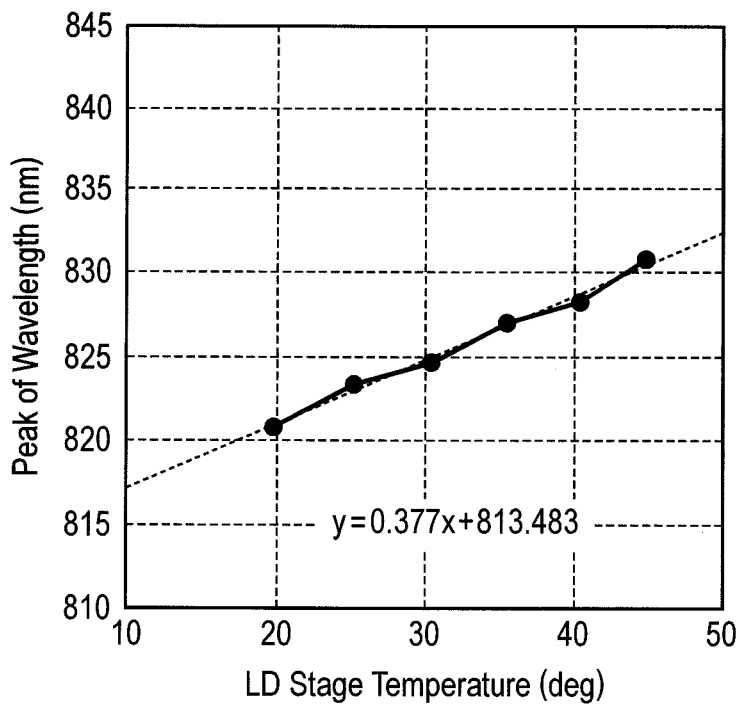
FIG. 18 is a graph showing the temperature dependence of the light emitting wavelength of the semiconductor laser.

FIG. 18 is a graph showing oscillation wavelengths obtained using the spectrum analyzer while changing the temperature of the semiconductor laser before manufacturing the thermally assisted magnetic head gimbal assembly. The oscillation wavelength of the semiconductor laser is proportional to the temperature, and the proportionality factor of the temperature is 0.377 nm/° C. This proportionality factor is known to be correlated to the temperature coefficient of the refraction index of the active layer of the semiconductor laser being used and to be 0.2 to 0.4 nm/° C. if the semiconductor laser is a GaN semiconductor as used in the present invention. That is, by measuring the oscillation wavelength of the semiconductor laser, it is possible to directly know the temperature of the active layer of the semiconductor laser. Thus, accurate measurement can be made compared to when the temperature of the entire slider is obtained using a temperature sensor as in the related-art example. Further, the preset temperature range is below a temperature 10° C. higher than the temperature of the semiconductor laser of an acceptable thermally assisted magnetic head gimbal assembly. Thus, the detection wavelength range of a defective product becomes about 5 nm or more. As a result, inspection can be performed using a Czerny-Turner spectroscope with low wavelength measurement accuracy.

In this embodiment, it is assumed that the drive temperature is 50° C.; the upper limit drive temperature of the semiconductor laser is 90° C.; and the estimated amount of temperature increase when performing thermally assisted magnetic recording using the semiconductor laser is 20° C. In this case, "the preset temperature range" is below a temperature 10° C. higher than the temperature of the semiconductor laser of an acceptable thermally assisted magnetic head gimbal assembly, considering variations in electrical properties of the FTC other than the LD or in the bonding step. Of course, "the present temperature range" can be increased, for example, by reducing the drive temperature to less than 50° C. or using a semiconductor laser having a high upper limit drive temperature. Preferably, an allowable temperature range Q is 10 to 40° C. The upper limit 40° C. represents the difference between the guaranteed upper operating temperature of a general semiconductor laser, about 90° C., and the drive operation temperature in which the thermally assisted magnetic head is used, about 50° C. In an environment in which a temperature difference larger than 40° C. occurs, there is a high possibility that the semiconductor laser may not emit light. On the other hand, the lower limit 10° C. is determined by the detection accuracy of the spectrum analyzer used in monitoring of the wavelength and by the longitudinal mode spacing of the semiconductor laser being used. The longitudinal mode spacing of the semiconductor laser refers to the spacing between wavelengths that the semiconductor laser can emit and is determined by the length of the resonator of the semiconductor laser and the refraction index of the material for the resonator. For example, the longitudinal mode spacing of the laser used in this embodiment is less than 1 nm. The detection accuracy of the spectrum analyzer is determined by the fineness of a diffraction grating used for detection, the width of a slit used for detection, and the size of the detector. In this embodiment, the detection accuracy is the order of 1 to 2 nm. Accordingly, the range where the wavelength measurement accuracy can be assured using the current detection system is preferably 2 nm or more and around 10° C. in terms of the allowable temperature range Q.

Figure 19:
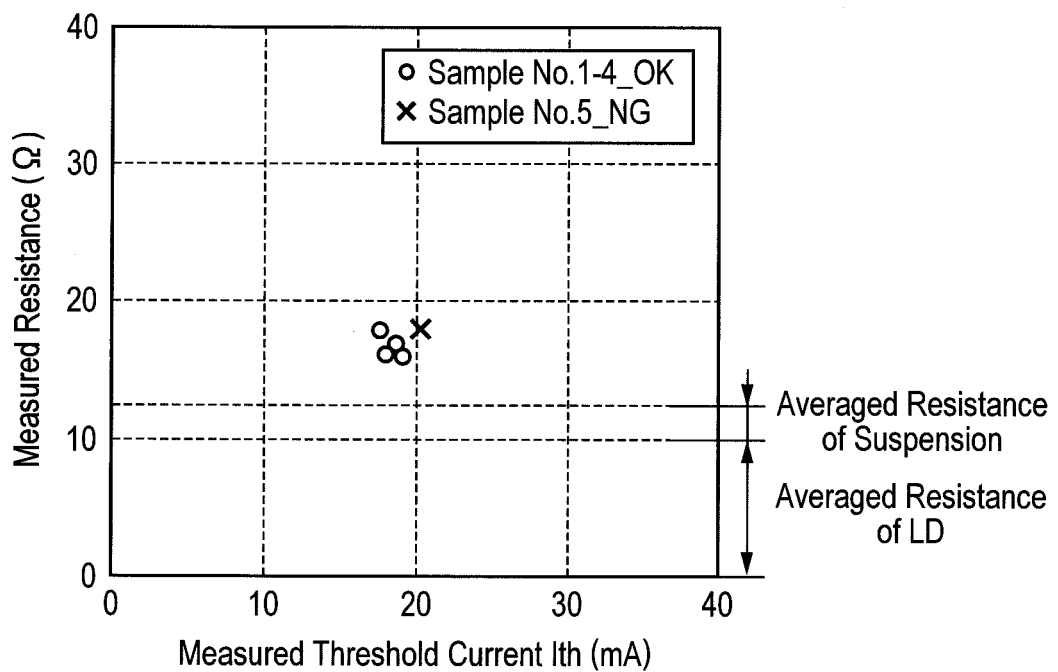
FIG. 19 is a diagram showing measurements of the threshold current and electrical resistance of multiple thermally assisted magnetic head gimbal assemblies.

In this embodiment, the threshold current of the semiconductor laser and the resistance of the electrical circuit including the semiconductor laser were measured with respect to manufactured five thermally assisted magnetic head gimbal assemblies (including one defective product), as shown in FIG. 19. In the field of semiconductor laser production, failure analysis is performed on semiconductor lasers by inspecting whether there is a difference in threshold current or resistance between a defective product sample and a normal product. However, as is understood from FIG. 19, any significant difference could not be found between a normal product and a defective product with respect to the manufactured five thermally assisted magnetic head gimbal assemblies. This is because the resistance observed in each thermally assisted magnetic head gimbal assembly was not the resistance of the semiconductor laser alone but the sum of the respective resistances of the semiconductor laser, the semiconductor laser fixing part (conductive adhesive), the FPC, and the like and, accordingly, it is difficult to identify a defective product on the basis of only the total resistance. Further, the threshold current of the semiconductor laser in the thermally assisted magnetic head gimbal assembly was shifted from the threshold current of the semiconductor laser alone. This is because in the thermally assisted magnetic head gimbal assembly, the semiconductor laser is fixed in such a manner that the semiconductor laser is close to the slider with the distance to the slider being several μm, causing optical feedback to the semiconductor laser. This makes it impossible to use the traditional defective product identification method in the field of semiconductor laser manufacturing.

Figure 20:
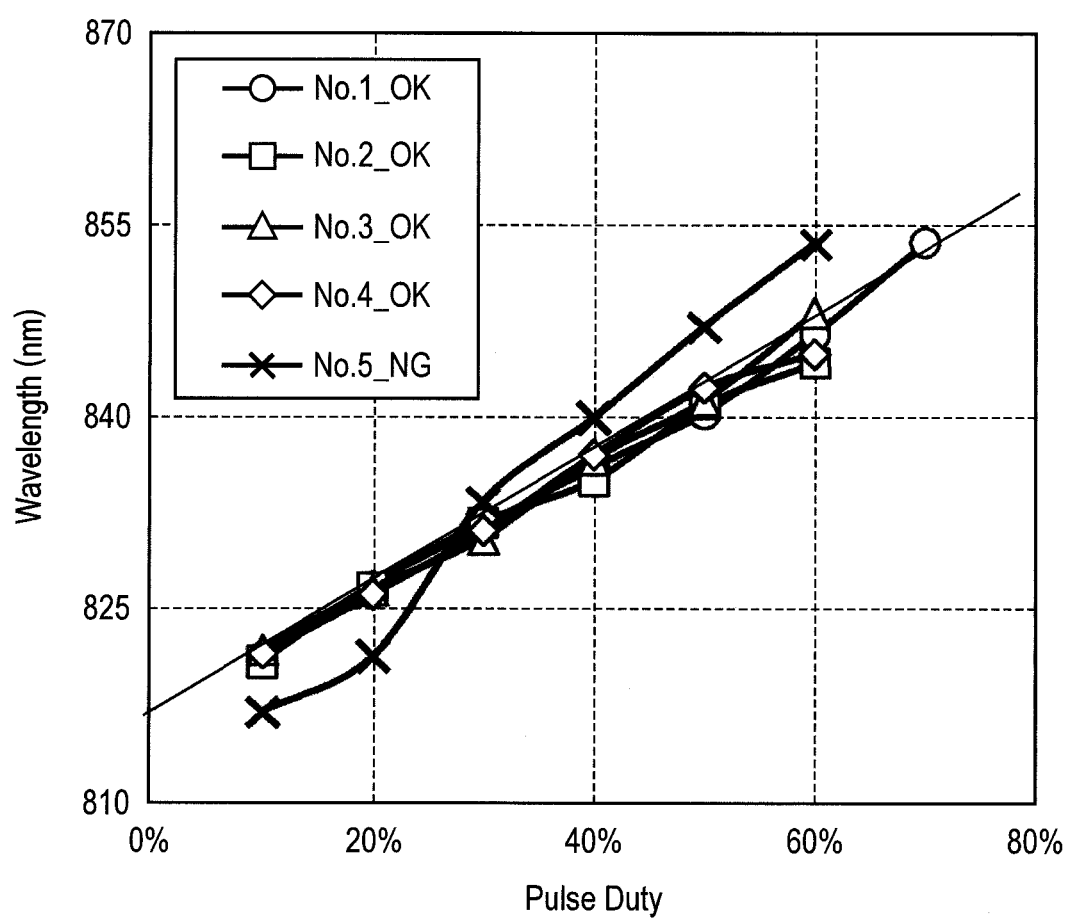
FIG. 20 is a graph showing measurements of the wavelength with respect to the light-emitting time percentage of the semiconductor laser.

For this reason, in this embodiment, as shown in FIG. 20, the wavelength was measured while changing the light-emitting time of the semiconductor laser using an external power supply for inspection (S53). FIG. 19 shows no difference in threshold current or resistance between the defective product and acceptable products. On the other hand, the wavelength measurements shown in FIG. 20 reveal that the defective product sample alone had wavelengths about 5 to 10 nm longer than the normal products as the light-emitting time became longer, that is, as the duty became larger. As shown in FIG. 18, the temperature coefficient of the semiconductor laser used in this embodiment was found to be 0.377 nm/° C. Accordingly, the internal temperature of the semiconductor laser of the defective product sample was estimated to have increased by 13.3 to 26.5° C. compared to that of a standard product (acceptable product) (S61).

For a thermally assisted magnetic head, the condition that the "preset temperature range Q" defined in the formula below is below a temperature 10° C. higher than the semiconductor laser of an acceptable thermally assisted magnetic head gimbal assembly was used to identify an acceptable product among products under inspection. Thus, a defective semiconductor laser could be identified by simply comparing reference data stored in the apparatus with the wavelength measured in the product under inspection. As a result, a sample having a high internal temperature during inspection could be eliminated as a defective product (S62).

$$\Delta T = \alpha \cdot \Delta\lambda_{rms} < Q/((T_2-T_1)) \quad \text{Formula 1}$$

provided that $$\Delta\lambda_{rms} = \sqrt{\frac{1}{T_2-T_1}\int_{T2}^{T1}[(\lambda_{LD}(t)-\lambda_{ref})(t)]dt}$$

where

Q represents an allowable temperature range;

ΔT represents the difference in temperature between the semiconductor laser of the product under inspection and that of an acceptable product;

$T_1$ represents a first light-emitting time percentage (duty);

$T_2$ represents a second light-emitting time percentage (duty);

$\Delta\lambda_{rms}$ represents the square root of the mean square of the amount of wavelength shift of the LD of the product under inspection (HGA) with the semiconductor laser (LD) of the acceptable (reference) product during an interval $T_1$ to $T_2$ used as a reference;

$\lambda_{LD}$ represents the oscillation wavelength of the LD of the product under inspection (HGA);

$\lambda_{ref}$ represents the oscillation wavelength of the LD of the acceptable (reference) product; and α represents the temperature coefficient of the oscillation wavelength of the semiconductor laser (nm/deg).

The thermally assisted magnetic head can be regarded as an acceptable product when $\Delta T < Q/(T_2-T_1)$ with respect to a combination of any first light-emitting time percentage (duty) $T_1$ and any second light-emitting time percentage (duty) $T_2$ in the formula above. $\lambda_{LD}(t)$ represents the oscillation wavelength of the semiconductor laser measured when $T_2$ is changed in the LD of the product under inspection (HGA). On the other hand, $\lambda_{ref}(t)$ represents the oscillation wavelength of the semiconductor laser measured when the first light-emitting time percentage $T_1$ (duty) is changed to the second light-emitting time percentage $T_2$ (duty) in the LD of the acceptable product (reference). The square root of the mean square of the difference between $\lambda_{LD}(t)$ and $\lambda_{ref}(t)$, $\Delta_{\lambda rms}$ represents an interval-average wavelength shift amount corresponding to an increase in LD temperature when the LD is mounted on the product under inspection (HGA), compared to the acceptable product. Multiplication of $\Delta\lambda_{rms}$ by the temperature coefficient α of the semiconductor laser allows estimation of the temperature difference ΔT between the semiconductor laser of the product under inspection and that of the acceptable product.

While $T_1$ and $T_2$ may take any value of 0 to 1, it is preferred to increase the difference between $T_1$ and $T_2$ to carry out an accurate inspection. However, when $T_1$ and $T_2$ are increased, the temperature of the LD becomes too high in an inspection state, where the HGA is not flying over the medium, unlike in an actual hard disk drive. Thus, the temperature of the LD is increased to the extent that even the LD of an acceptable product cannot emit light. For this reason, it is preferred to set $T_1$ to about 0.05, that is, a value that is as close to 0 as possible and limit $T_2$ to about 0.3.

[4] Effects

Next, effects of the thermally assisted magnetic head according to this embodiment will be described.

During a write operation or read operation, the thermally assisted magnetic head hydrodynamically flies to a predetermined fly height over the surface of the rotating magnetic disk. At this time, the edge adjacent to the medium-opposed surface S of the reading head or recording head is opposed to the magnetic disk with a minute spacing therebetween. A read is performed when a data signal magnetic field is sensed; a write is performed when a data signal magnetic field is applied. As shown in FIG. 5, during a write of a data signal, laser light emitted by the semiconductor laser 7 and propagated through the optical waveguide 12 reaches the near-field light generator 13, which then generates near-field light. Use of the near-field light allows thermally assisted magnetic recording to be performed. By using thermally assisted magnetic recording, a write is performed on a coercive magnetic disk using a thin-film magnetic head for vertical magnetic recording. Thus, the recording bits are extremely miniaturized. As a result, a 1 Tb/in$^2$-level recording density, for example, can be achieved.

While the thermally assisted magnetic head according to this embodiment has been described in detail, the present invention is not limited thereto. For example, while the near-field light generator 13 is triangular in this embodiment, it may be recessed or trapezoidal. Alternatively, it may have a structure called bow tie, where a pair of triangular or trapezoidal plates are disposed in such a manner that the tops or short sides thereof are opposed to each other as separated from each other by a predetermined distance. Further, the near-field light generator 13 may have an aperture smaller than the wavelength of laser light. In this embodiment, the electromagnetic transducer is formed by layering a recording element including a single-pole head; and a playback element including a CPP/GMR sensor. However, the recording element may have various structures. The recording element may include a layer of thin-film coil, two or more layers of thin-film coil, or a helical coil. Further, the playback sensor may be a giant magneto-resistive (GMR) element that has a high magnetoresistance change rate and uses a giant magnetoresistance effect, an anisotropy magneto-resistive (AMR) element that uses an anisotropic magnetoresistance effect, a tunnel magneto-resistive (TMR) element that uses a magnetoresistance effect caused by a tunnel junction, a current-perpendicular-to-plane (CPP)-GMR element, or the like. Light may be used to perform playback. Detection of the polarization rotation of optical feedback from the recording bits allows detection of the magnetization orientation of the recording bits. The semiconductor laser driver and magnetic head driver used in this embodiment may be formed into an IC chip along with the signal processing LSI and inserted into any position of the suspension.

As described above, the thermally assisted magnetic head gimbal manufacturing apparatus according to this embodiment is an apparatus for not only manufacturing but also inspecting a thermally assisted magnetic head gimbal. The apparatus structure and functions related to inspection are also applicable to a second embodiment described below.

The thermally assisted magnetic head gimbal manufacturing apparatus according to this embodiment includes the first holder configured to hold a sub-mount; the second holder configured to hold the magnetic head portion; the fine-adjustment mobile unit that can adjust the position and angle of the second holder; the first light detection means configured to monitor light from the semiconductor laser; the mobile unit that can adjust the position and angle of the first light detection mean; the first calculator configured to calculate information indicating the relative position and inclination between the light detection means and the semiconductor laser using luminance distribution data obtained by adjusting the position and angle of the first light detection means using the mobile unit; the second calculator configured to move the magnetic head portion held by the second holder using the fine-adjustment mobile unit while driving the semiconductor laser held by the first holder and to calculate the position of the light waveguide disposed on the magnetic head portion with respect to the semiconductor laser using the luminance distribution data obtained by the light detection means; the semiconductor laser/slider fixing apparatus configured to fix the magnetic head portion and the semiconductor laser; the second light detection means configured to obtain light emitted by the semiconductor laser; the spectrum analyzer configured to measure the wavelength of light obtained by the second light detection mean; and the third calculator configured to identify a defective product on the basis of the wavelength of light obtained by the spectrum analyzer. The magnetic head portion is moved by the fine-adjustment mobile unit using the information obtained by the first calculator and the information obtained by the second calculator in such a manner that the light emission point of the semiconductor laser is aligned with an extended axis of the light waveguide. Subsequently, the thermally assisted magnetic head is assembled using the semiconductor laser/slider fixing apparatus, and the thermally assisted magnetic head, the suspension, and the FPC substrate are assembled. Subsequently, the FPC substrate is driven while changing the light-emitting time of the semiconductor laser. As a result, a defective thermally assisted magnetic head gimbal assembly can be identified by the third calculator.

Use of an image sensor as the first light detection means allows easy alignment between the light waveguide disposed on the magnetic head portion and the semiconductor laser. Use of an optical fiber as the second light detection means allows acquisition of light emitted by the semiconductor laser from the side of the semiconductor laser opposite to the side opposed to the slider. This facilitates addition of an inspection system to existing manufacturing apparatuses. Use of a Czerny-Turner spectroscope which uses a diffraction grating and an array CCD sensor and includes no movable unit, as the spectrum analyzer allows the wavelength to be measured even when the semiconductor laser is caused to emit light only for a short period of time during inspection. Thus, the possibility that a thermally assisted magnetic head gimbal assembly may be broken during inspection can be reduced.

A method for manufacturing a thermally assisted magnetic head according to this embodiment is a method for not only manufacturing but also inspecting a thermally assisted magnetic head gimbal. The portions related to inspection are also applicable to the second embodiment described below.

The method for manufacturing a thermally assisted magnetic head according to this embodiment includes a first step of holding the sub-mount to which the semiconductor laser is fixed using the first holder, driving the semiconductor laser disposed on the first holder, and calculating the relative position and inclination between the light detection means and the semiconductor laser on the basis of luminance distribution data detected by the first light detection means; a second step of driving the semiconductor laser and calculating the position of the light waveguide disposed on the magnetic head portion by monitoring the output of the semiconductor laser using the first light detection means while two-dimensionally moving the magnetic head portion held by the second holder below the semiconductor laser; a third step of bonding and fixing the sub-mount to the magnetic head portion in this state to manufacture a thermally assisted magnetic head; a fourth step of assembling the thermally assisted magnetic head, the suspension, and the FPC substrate to manufacture a thermally assisted magnetic head gimbal assembly; a fifth step of driving the semiconductor laser via the FPC substrate and estimating the difference in temperature between the semiconductor laser of a product under inspection and the semiconductor laser of an acceptable product by referring to information storing temperature dependence data of the oscillation wavelength of the acceptable semiconductor laser previously obtained on the basis of the wavelength of light emitted by the semiconductor laser detected by the second light detection means using the spectrum analyzer; and a sixth step of identifying the thermally assisted magnetic head gimbal assembly as a defective product when the temperature difference between the respective semiconductor lasers of the product under inspection and the acceptable product obtained in the fifth step falls out of a preset temperature range.

Second Embodiment

Thermally Assisted Magnetic Head Inspection Apparatus

Figure 24:
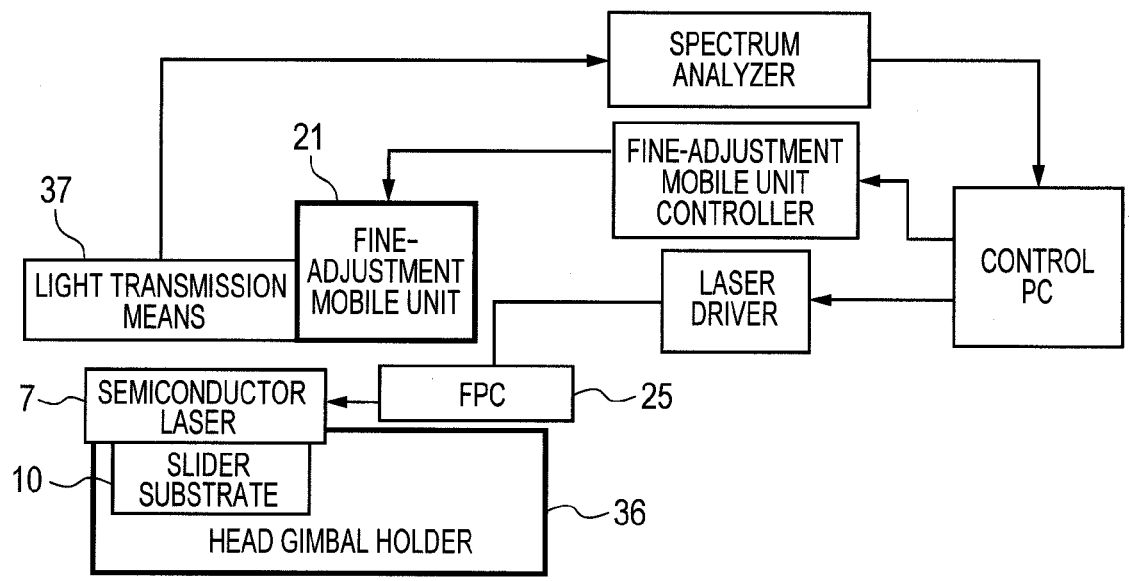
FIG. 24 is a block diagram showing a configuration of a thermally assisted magnetic head inspection apparatus.
Figure 25:
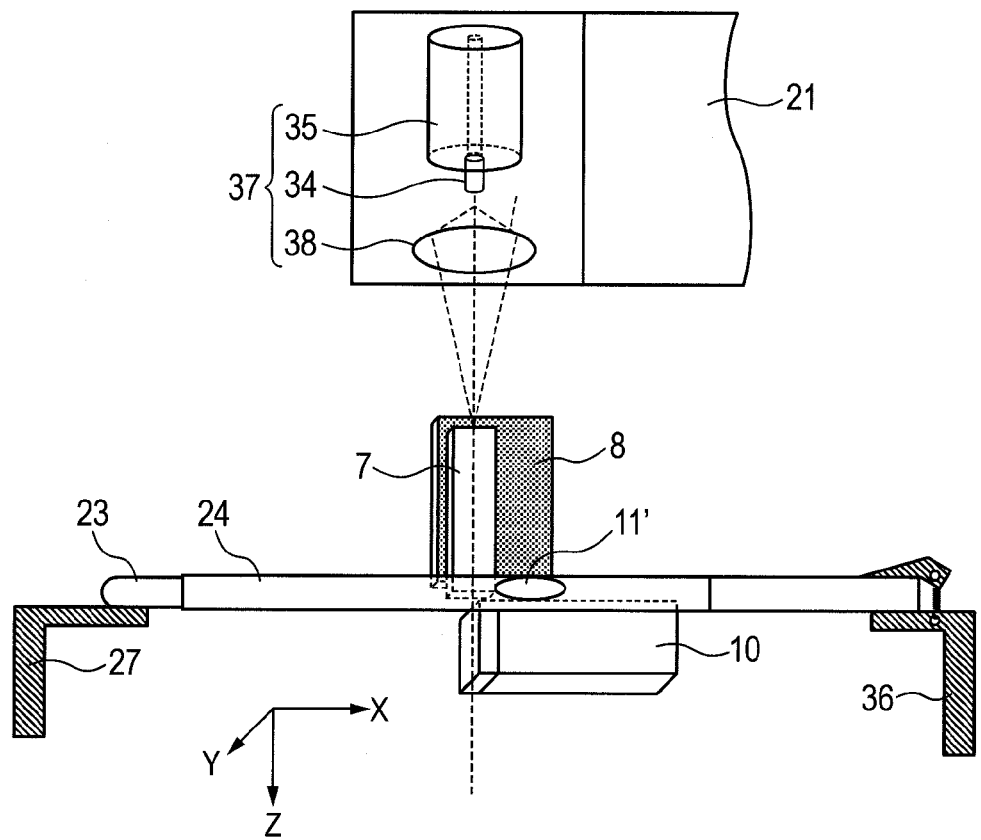
FIG. 25 is a schematic diagram of the thermally assisted magnetic head inspection apparatus.

Referring now to FIGS. 24 to 26, a thermally assisted magnetic head gimbal assembly inspection apparatus according to a second embodiment will be described. The inspection apparatus does not require an assembly system, unlike in the first embodiment. Thus, the number of apparatus drive units can be reduced. The light transmission means includes not only the optical fiber according to the first embodiment but also a focusing optical element (lens). This eliminates the need to bring the optical fiber close to the rear of the semiconductor laser so that the distance therebetween is in units of microns. As a result, it is possible to easily inspect the thermally assisted magnetic head, as well as to provide a low-cost inspection apparatus.

Referring to FIGS. 24 to 25, an example configuration of the thermally assisted magnetic head inspection apparatus will be described. As shown in a block diagram of FIG. 24 and a schematic diagram of FIG. 25, the thermally assisted magnetic head inspection apparatus according to this embodiment includes light transmission means 37 including the optical fiber 34, the optical fiber coating 35, and a focusing optical element (lens) 38; and the fine-adjustment mobile unit 21 configured to move the light transmission means 37. While the thermally assisted magnetic head inspection apparatus also includes a head gimbal holder 36 configured to hold a thermally assisted magnetic head gimbal assembly, it does not need other mobile units unlike in the first embodiment because it does not need to perform an assembly operation. The thermally assisted magnetic head gimbal assembly, that is, the semiconductor laser 7 fixed to the sub-mount 8, the slider substrate 10, the cured adhesive 11', the load beam 23, the suspension 24, and the clamp 27 has the same configuration as in the first embodiment and therefore will not be described. Of course, the thermally assisted magnetic head inspection apparatus according to this embodiment may include the same components as those according to the first embodiment or components that differ in size or the like from those according to the first embodiment.

Next, referring to FIG. 26, the apparatus and method for inspecting a thermally assisted magnetic head according to the second embodiment will be described. The portions common to the second and first embodiments will not be described.

First, a thermally assisted magnetic head gimbal assembly is set in the head gimbal holder 36 (S71). The semiconductor laser was driven using an external power supply via the FPC substrate (S72). The wavelength of the semiconductor laser was detected from the rear of the semiconductor laser using the spectrum analyzer via the light transmission means 37 (S73). The wavelength was detected using an external power supply for inspection in the same manner while changing the light-emitting time of the semiconductor laser (S74). As in the first embodiment, one semiconductor laser alone was found to have a wavelength by 5 to 10 nm longer than the other normal products. Since the same semiconductor laser as in the first embodiment was used, the temperature coefficient thereof was found to be 0.377 nm/° C. The internal temperature of the semiconductor laser of a defective sample was estimated to have increased by 13.3 to 26.5° C. compared to the normal products (S75). The allowable temperature of the thermally assisted magnetic head was determined in consideration of the internal temperature of the hard disk drive, and the allowable range was set to below a temperature 10° C. higher than the semiconductor laser of an acceptable thermally assisted magnetic head gimbal assembly, as in the first embodiment. Thus, the sample having the high internal temperature was eliminated as a defective product (S76).

The present invention is not limited to the above-mentioned embodiments and includes various modifications. While the embodiments have been described in detail to clarify the present invention, the invention is not to be construed as always including all the described components. Some components of an embodiment may be replaced with components of another embodiment, and an embodiment may additionally include components of another embodiment. Some components may be deleted from each embodiment.

What is claimed is:

1. A thermally assisted magnetic head inspection apparatus for inspecting a thermally assisted magnetic head, the thermally assisted magnetic head including a magnetic head portion having an optical waveguide formed thereon, a semiconductor laser, and a sub-mount holding the semiconductor laser, the sub-mount being fixed to the magnetic head portion, laser light emitted by the semiconductor laser entering the optical waveguide of the magnetic head portion, the thermally assisted magnetic head inspection apparatus comprising:
   a spectrum analyzer configured to measure an oscillation wavelength of the semiconductor laser;
   a light transmission unit configured to lead light emitted by the semiconductor laser to the spectrum analyzer; and
   a calculator configured to calculate a temperature of the semiconductor laser on the basis of a wavelength obtained by the spectrum analyzer,
   wherein the semiconductor laser is driven while changing a light-emitting time percentage and, when the temperature of the semiconductor laser calculated by the calculator falls out of a preset temperature range, the thermally assisted magnetic head is identified as a defective product.

2. The thermally assisted magnetic head inspection apparatus according to claim 1,
   wherein the light transmission unit is a focusing optical element and an optical fiber.

3. The thermally assisted magnetic head inspection apparatus according to claim 1,
   wherein the spectrum analyzer is a Czerny-Turner spectroscope.

4. The thermally assisted magnetic head inspection apparatus according to claim 1,
   wherein a thermally assisted magnetic head under inspection is identified as an acceptable product when meeting Formula 1

$$\Delta T = \alpha \cdot \Delta \lambda_{rms} < Q/(T_2 - T_1) \qquad \text{Formula 1}$$

provided that $$\Delta \lambda_{rms} = \sqrt{\frac{1}{T_2 - T_1} \int_{T2}^{T1} [(\lambda_{LD}(t) - \lambda_{ref})(t)] dt}$$

where $\Delta T$ represents the difference in temperature between the semiconductor laser of the product under inspection and that of an acceptable product; $T_1$ represents a first light-emitting time percentage; $T_2$ represents a second light-emitting time percentage; $\Delta \lambda_{rms}$ represents the square root of the mean square of the amount of wavelength shift of a semiconductor laser of the thermally assisted magnetic head under inspection with a semiconductor laser of an acceptable thermally assisted magnetic head during an interval $T_1$ to $T_2$ used as a reference; $\lambda_{LD}$ represents an oscillation wavelength of the semiconductor laser of the thermally assisted magnetic head under inspection; $\lambda_{ref}$ represents an oscillation wavelength of the semiconductor laser of the acceptable thermally assisted magnetic head, $\alpha$ represents a temperature coefficient of the oscillation wavelength of the semiconductor laser, $\alpha$ being expressed in nm/deg; and Q represents an allowable temperature range.

5. The thermally assisted magnetic head inspection apparatus according to claim 4,
   wherein the allowable temperature range Q is 10 to 40° C., and the temperature coefficient $\alpha$ is 0.2 to 0.4 nm/deg.

6. A method for inspecting a thermally assisted magnetic head, the thermally assisted magnetic head including a magnetic head portion having an optical waveguide formed thereon, a semiconductor laser, and a sub-mount holding the semiconductor laser, the sub-mount being fixed to the magnetic head portion, laser light emitted by the semiconductor laser entering the optical waveguide of the magnetic head portion, the method comprising:
   a first step of driving the semiconductor laser while changing a light-emitting time percentage and detecting a wavelength of emitted light;
   a second step of estimating a temperature of the semiconductor laser on the basis of the detected wavelength of the emitted light;
   a third step of, when the temperature of the semiconductor laser estimated in the second step falls out of a preset temperature range, identifying the thermally assisted magnetic head as a defective product.

7. The method for inspecting a thermally assisted magnetic head according to claim 6,
   wherein the second step comprises estimating the temperature of the semiconductor laser by referring to a relationship between an oscillation wavelength and temperature of the semiconductor laser, the relationship being stored in memory.

8. The method for inspecting a thermally assisted magnetic head according to claim 6,
   wherein the third step comprises identifying the thermally assisted magnetic head as a defective product when the estimated temperature is 10° C. or higher than in a standard product.

* * * * *